(12) United States Patent
Mondal et al.

(10) Patent No.: US 12,340,606 B2
(45) Date of Patent: Jun. 24, 2025

(54) AUTOMATIC TEMPLATE RECOMMENDATION

(71) Applicant: Adobe Inc., San Jose, CA (US)

(72) Inventors: Prasenjit Mondal, Noida (IN); Sachin Soni, Delhi (IN); Anshul Malik, Delhi (IN)

(73) Assignee: Adobe Inc., San Jose, CA (US)

( * ) Notice: Subject to any disclaimer, the term of this patent is extended or adjusted under 35 U.S.C. 154(b) by 359 days.

(21) Appl. No.: 17/984,058

(22) Filed: Nov. 9, 2022

(65) Prior Publication Data

US 2024/0153294 A1 May 9, 2024

(51) Int. Cl.
| | | |
|---|---|---|
| G06V 30/19 | (2022.01) | |
| G06T 7/11 | (2017.01) | |
| G06T 7/194 | (2017.01) | |
| G06V 10/60 | (2022.01) | |
| G06V 20/62 | (2022.01) | |
| G06V 30/244 | (2022.01) | |

(52) U.S. Cl.
CPC .......... *G06V 30/19013* (2022.01); *G06T 7/11* (2017.01); *G06T 7/194* (2017.01); *G06V 10/60* (2022.01); *G06V 20/62* (2022.01); *G06V 30/19073* (2022.01); *G06V 30/19107* (2022.01); *G06V 30/245* (2022.01)

(58) Field of Classification Search
CPC ....... G06V 30/19013; G06V 30/19107; G06V 30/245; G06V 10/60; G06V 20/62; G06V 30/19073; G06T 7/194; G06T 7/11
See application file for complete search history.

(56) References Cited

U.S. PATENT DOCUMENTS

| | | | | |
|---|---|---|---|---|
| 7,793,217 B1 * | 9/2010 | Kim | ...... | G16H 80/00 |
| | | | | 715/255 |
| 8,254,679 B2 * | 8/2012 | Marchesotti | ........ | G06T 7/194 |
| | | | | 382/254 |
| 9,251,580 B2 * | 2/2016 | Nykyforov | ........... | G06T 7/90 |
| 9,576,210 B1 * | 2/2017 | Liu | ...... | G06T 7/0002 |
| 9,639,301 B2 * | 5/2017 | Sugimoto | ......... | G06F 3/125 |

(Continued)

OTHER PUBLICATIONS

Almoznino, E., et al., "A procedure for the calculation of background in images", Mon. Not. R. Astron. Soc., vol. 265, 1993, pp. 641-648.

(Continued)

*Primary Examiner* — Gregory M Desire
(74) *Attorney, Agent, or Firm* — Nicholson De Vos Webster & Elliott LLP

(57) ABSTRACT

Embodiments are disclosed for providing customizable, visually aesthetic color diverse template recommendations derived from a source image. A method may include receiving a source image and determining a source image background by separating a foreground of the source image from a background of the source image. The method separates a foreground from the background by identifying portions of the image that belong to the background and stripping out the rest of the image. The method includes identifying a text region of the source image using a machine learning model and identifying font type using the identified text region. The method includes generating an editable template image using the source image background, the text region, and the font type.

20 Claims, 22 Drawing Sheets

(56) References Cited

U.S. PATENT DOCUMENTS

| | | | |
|---|---|---|---|
| 9,860,502 B2* | 1/2018 | Urban | G06T 11/001 |
| 10,109,092 B1* | 10/2018 | Hitchings, Jr. | G06T 11/60 |
| 10,439,971 B1* | 10/2019 | Beale | G06N 3/045 |
| 11,481,823 B1* | 10/2022 | Khamkar | G06V 30/1983 |
| 11,610,054 B1* | 3/2023 | Aggarwal | G06F 40/30 |
| 11,688,190 B2* | 6/2023 | Zhang | G06V 10/26 382/176 |
| 11,847,414 B2* | 12/2023 | Dvijotham | G06N 20/00 |
| 12,100,162 B2* | 9/2024 | Li | G06T 7/143 |

OTHER PUBLICATIONS

Barnes, C., et al., "PatchMatch: A Randomized Correspondence Algorithm for Structural Image Editing", ACM Trans. Graph., 2009, 10 pages.

Belongie, S., et al., "Shape Matching and Object Recognition Using Shape Contexts", IEEE Transactions on Pattern Analysis and Machine Intelligence, vol. 24, No. 24, Apr. 2002, pp. 509-522.

Chen, X., et al., "Background Estimation and Its Applications", Chapter 1.5, Department of Computing Science, Retrieved on Feb. 13, 2023, pp. 93-113.

Cho, T. S., et al., "The patch transform and its applications to image editing", 2008 IEEE Conference on Computer Vision and Pattern Recognition, 2008, 8 pages.

Cohen-Or, D., et al., "Color Harmonization", ACM, 2006, pp. 624-630.

Efros, A. A., et al., "Image Quilting for Texture Synthesis and Transfer", SIGGRAPH '01: Proceedings of the 28th annual conference on Computer graphics and interactive techniques, Aug. 2001, pp. 341-346.

Han, X., et al., "MatchNet: Unifying Feature and Metric Learning for Patch-Based Matching", CVPR, 2015, pp. 3279-3286.

Jahrer, M., et al., "Learned local descriptors for recognition and matching", Computer Vision Winter Workshop, 2008, 8 pages.

Lu, Y., et al., "Background Removal in Image indexing and Retrieval", Department of Electrical and Computer Engineering, Retrieved on Feb. 9, 2023, 6 pages.

Melekov, I., et al., "Image Patch Matching Using Convolutional Descriptors with Euclidean Distance", arXiv:1710.11359v1, Oct. 31, 2017, pp. 1-16.

Pal, D., "Blur of Change Background of Images using Machine Learning with Tensorflow", Analytics Vidhya Medium, Jun. 12, 2020, 11 pages.

Qi, W., et al., "SaliencyRank: Two-stage manifold ranking for salient object detection", Computational Visual Media, vol. 1, No. 4, Dec. 2015, pp. 309-320.

Shechtman, E., et al., "Matching Local Self-Similarities across Images and Videos", 2007 IEEE Conference on Computer Vision and Pattern Recognition, 2007, pp. 1-8.

Shorten, C., et al., "A survey on Image Data Augmentation for Deep Learning", Journal of Big Data, 2019, pp. 1-48.

Sultana, M., et al., "Unsupervised Deep Context Prediction for Background Estimation and Foreground Segmentation", arXiv:1805.07903v1, May 21, 2018, pp. 1-17.

Teknomo, K., et al., "Background Image Generation Using Boolean Operations", Philippine Computing Journal, vol. 4, No. 2, Dec. 2009, pp. 43-49.

Tocker, Y., et al., "Dynamic Spatial Predicted Background", IEEE Transactions on Image Processing, vol. 29, 2020, pp. 5517-5530.

Tola, E., et al., "A Fast Local Descriptor for Dense Matching", Computer Vision Laboratory, 2008, 8 pages.

Walshe, R. C., et al., "Detection of occluding targets in natural backgrounds", Journal of Vision, vol. 20, No. 13, 2020, pp. 1-20.

Zagoruyko, S., et al., "Learning to Compare Image Patches via Convolutional Neural Networks", arXiv:1504.03641v1, Apr. 14, 2015, 9 pages.

Zbontar, J., et al., "Stereo Matching by Training a Convolutional Neural Network to Compare Image Patches", Journal of Machine Learning Research, vol. 17, 2016, pp. 1-32.

Zheng, R. Z., "Image Segmentation: Predicting Image Mask with Carvana Data", Towards Data Science, Apr. 27, 2020, 11 pages.

Zhu, H., et al., "Adaptive Background Image Calculation for Video Sequences Based on Optical Flow", Advanced Materials Research, vols. 945-949, 2014, pp. 1820-1824.

* cited by examiner

PROJECTED LINES IN A FIRST
DIRECTION 1010

PROJECTED LINES IN A SECOND
DIRECTION 1020

AUTOMATIC TEMPLATE RECOMMENDATION

BACKGROUND

Artists, photographers, and other creators (herein referred to as "users") spend significant time selecting and modifying templates. A template is a generic image (or portion of an image) used to create a personalized image. Users can modify the template (e.g., font, size of font, size of objects in the template, background colors, etc.) customizing the template, resulting in a personalized image. The modification of templates is time consuming because the user may spend significant time tuning colors, font sizes, font types, etc. Accordingly, the creative process of generating personalized images from templates is time consuming for users. The time it takes users to generate personalized images results in increased power consumption and computational resource consumption (e.g., bandwidth, memory, etc.) as users execute software operations to tune the template.

SUMMARY

Introduced here are techniques/technologies provide template recommendations. More specifically, in one or more embodiments, a template recommendation system is configured to provide customizable, visually aesthetic color diverse template recommendations derived from a source image. If a user changes an aspect of the template recommendation (e.g., the appearance of an object in the template), the template recommendation system re-computes template recommendations.

In operation, provided a static image, the template recommendation system determines the background of the image, one or more color harmonized templates based on the background of the image, font locations, and font types present in the image. In this manner, the template recommendation system provides completely customizable color diverse template recommendations based on a single static image. Users are able to manipulate or otherwise customize static images as if they are not static images.

Embodiments generate multiple template recommendations based on an image (or a portion of an image). The template recommendation system is used to identify portions of the image that belong to the background and strip out the rest of the image. Using the background of the image, the template recommendation system generates a set of color variations of the background. In this way, users are presented with multiple (e.g., diverse) aesthetically pleasing editable color variations of the image. Additionally, the template recommendation system employs at least one machine learning model to identify text regions and font types in the image to be used as part of the template. This way, when new text is added to the template, the resulting image retains similar text positioning and visual properties as in the original image.

Additional features and advantages of exemplary embodiments of the present disclosure will be set forth in the description which follows, and in part will be obvious from the description, or may be learned by the

BRIEF DESCRIPTION OF THE DRAWINGS

The detailed description is described with reference to the accompanying drawings in which.

DETAILED DESCRIPTION

Figure 1:
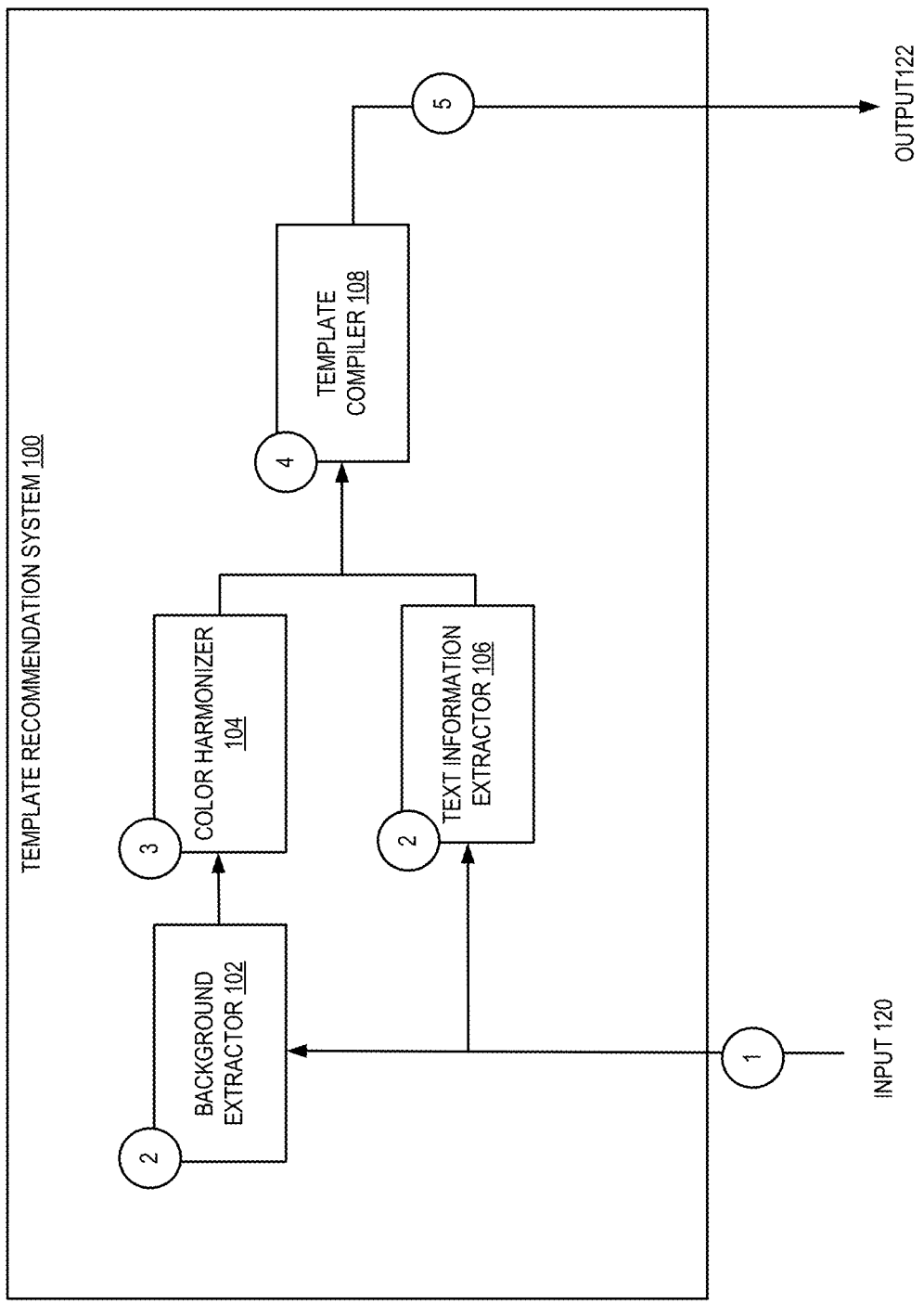
FIG. 1 illustrates a diagram of a process of providing customizable, visually aesthetic color diverse template recommendations derived from a source image in accordance with one or more embodiments.

One or more embodiments of the present disclosure include a template recommendation system configured to automatically extract template recommendations from an image and identify text information (including text location information and/or font type information). Providing template recommendations includes providing a customizable background of an image. The template recommendation system is configured to extract the background of the image such that a user can customize the image.

One conventional approach to extracting the background of an image is to use content-aware filling techniques to fill user selected regions of an image. These approaches use one or more algorithms to analyze local regions surrounding a user-selected region and determine a background to replace the user selected region. However, due to various document types, lighting conditions, etc., patching the user-selected region with a background results in information loss such that that patched region distorts the image.

Additional conventional approaches that may extract a background from an image may using deep learning approaches. For example, one or more machine learning models are trained to identify specific objects in an image and replace the object with a background such that a final background of the image can be determined. While deep learning approaches work well to process backgrounds with targeted objects in different images, such techniques do not perform well with generic images with unknown objects present in the image.

Another conventional approach may use saliency based methods to identify salient regions in an image and interpolate such regions using background filing algorithms. However, salient object detection may fail to identify text, logos, and other background components of an image. Accordingly, such approaches can not be used to extract a background from an image.

In other implementations, a conventional approach to compute the background of an image involves using a video sequence. For example, one or more algorithms may identify moving objects in an image and assume the static portion of the image is the background. However, these algorithms require multiple images (e.g., a video sequence). Accordingly, such approaches can not be used to determine a background from a single image.

In some conventional approaches, image segmentation based approaches are used to identify objects in an image. Moreover, segmentation based approaches are conventionally used to identify text regions in an image, where a text region is a location of text in the image. For example, one or more machine learning models or other algorithms can segment the image into multiple regions. The conventional methods may determine a boundary box of an object in the image using the probabilities of the object being present in each region. While segmentation based approaches can perform well on specific types of images, these approaches fail to identify exact object boundaries. Further, such systems may not accurately identify text regions given the range of various images received by the text recommendation system (e.g., computer generated images, digital images, images captured using a camera or other sensor, images with various lighting conditions, etc.).

To address these and other deficiencies in conventional systems, the template recommendation system of the present disclosure considers global features (like image gradients) for background computation to extract the background from an image. The consideration of global features prevents the need for any user-selection. As such, the recommendation system of the present disclosure extracts templates automatically, without any user intervention. Moreover, the template recommendation system of the present disclosure trains neural networks using a loss function that distills the training of the neural network. Implementing such a loss function results in a more finely-tuned neural network trained to identify text regions in an image.

FIG. 1 illustrates a diagram of a process of providing customizable, visually aesthetic color diverse template recommendations derived from a source image in accordance with one or more embodiments. As shown in FIG. 1, embodiments include a template recommendation system 100. The template recommendation system 100 executes various modules (e.g., background extractor 102, color harmonizer 104, text information extractor 106, and text compiler 108) to provide editable (or otherwise customizable) template recommendations for users. The background extractor 102 includes various managers described in FIG. 2, the color harmonizer 104 includes various managers described in FIG. 11, and the text information extractor 106 includes various managers described in FIG. 12.

At numeral 1, the scene enrichment system 100 receives an input 120. In some embodiments, the input 120 is an image (referred to herein as a source image). For example, the image may be a computer generated image, a frame of a video, a picture captured by a camera (or other sensor), a scanned image, and the like. In some implementations, the input 120 is a modified template (e.g., a user-modified output 122). For instance, the user may have modified the visual appearance of an object in a template recommendation (e.g., output 122). Subsequently, the modified template recommendation is fed back to the template recommendation system 100. In these cases, the background extractor 102, text information extractor 106, and/or color harmonizer 104 may re-execute operations described herein to update a user modified transmitted template recommendation.

At numeral 2, both the background extractor 102 and the text information extractor 106 receive the input 120. In some implementations, the background extractor 102 and text information extractor 106 receive the input 120 simultaneously and process the input in parallel. In other implementations, either background extractor 102 or the text information extractor 106 receives the input 120 and processes the input in series (e.g., first the background extractor 102 processes the input, and then the text information extractor 106 processes the input).

In some embodiments, the background extractor 102 and/or the text information extractor 106 are configured to perform various pre-processing steps on the input 120. For example, the background extractor 102 and/or the text information extractor 106 are configured to down-sample the input 120. Down-sampling the input 120 improves performance in various devices (e.g., mobile devices with less computational resources). By down-sampling the input 120, the background extractor 102 and/or the text information extractor 106 maintain the aspect ratio of the input 120. In an example implementation, the background extractor 102 down-samples an input image to a size of 640×480 such that minor image details are not distorted/lost The background extractor 102 and/or the text information extractor 106 are also configured to denoise an image (e.g., the input 120 and/or a down-sampled input). Digital images contain various types of noises which reduce the quality of images. As defined herein, noise is anything in the image that is unwanted or undesired (e.g., light fluctuations, sensor noise, etc.). The background extractor 102 and/or the text information extractor 106 can execute any suitable denoising algorithm (e.g., image enhancement technique) to denoise the image. In an example implementation, the background extractor 102 can smooth the image using an averaging filter with window size of 3.

Preprocessing the input 120 can also include the background extractor 102 and/or the text information extractor 106 computing a gray image from an image (e.g., the input 120, the down-sampled input, the denoised input, or some combination). The background extractor 102 and/or the text information extractor 106 are configured to execute any suitable color to grayscale conversion technique (e.g., the average method, the weighted method, etc.).

The background extractor 102 and/or the text information extractor 106 are also configured to compute the gradients of an image using any suitable mechanism (e.g., the input 120, the down-sampled input, the denoised input, the gray image, and/or some combination). For example, the image may be processed using a derivative filter. The gradient of the image represents the differences between each pixel and their adjacent pixels.

In some embodiments, the background extractor 102 and/or the text information extractor 106 are also configured to binarize an image (e.g., the input 120, the down-sampled input, the denoised input, the gray image, and/or some combination). The image is binarized using any suitable thresholding technique. The binarized gradient image is a tool used to extract contextual information in an image.

Responsive to receiving the input 120 (and after various pre-processing operations have optionally been performed), the background extractor 102 computes the image background and the text information extractor 106 determines text information (including text location information and font type information). The operations of the background extractor 102 and the text information extractor 106 are described further herein.

At numeral 3, the color harmonizer 104 receives the background template image extracted from the input 120 by the background extractor 102. The color harmonizer 104 executes one or more managers, as described herein, to determine a number of color harmonized background template images based on the background template image. The number of color harmonized background template images may be a user-selected value and/or a predetermined value (e.g., a value defined by an administrator). Harmonic colors are sets of colors that may be aesthetically pleasing based on color relationships in a color space. The color harmonizer 104 produces color harmonized versions of the background template image that shift the colors of the background template image, while still remaining faithful to the original color palette. The operations of the color harmonizer 104 are described further herein.

At numeral 4, the template complier 108 complies template recommendations (e.g., one or more editable template images) to be displayed to a user using a user interface. The template complier 108 receives a set of color harmonized background templates from the color harmonizer 104. As described herein, each color harmonized background template may be unique (e.g., visually distinct) from the other color harmonized background templates. The template compiler 108 also receives text information from the text information extractor 106. For example, the template compiler 108 receives font location information (e.g., a location of text in the input 120) and/or a font type used in the input 120. The text compiler 108 combines some or all of the received information to generate one or more customizable template recommendations to be displayed to a user. At numeral 5, the one or customizable template recommendations are transmitted for display on a user interface.

Figure 2:
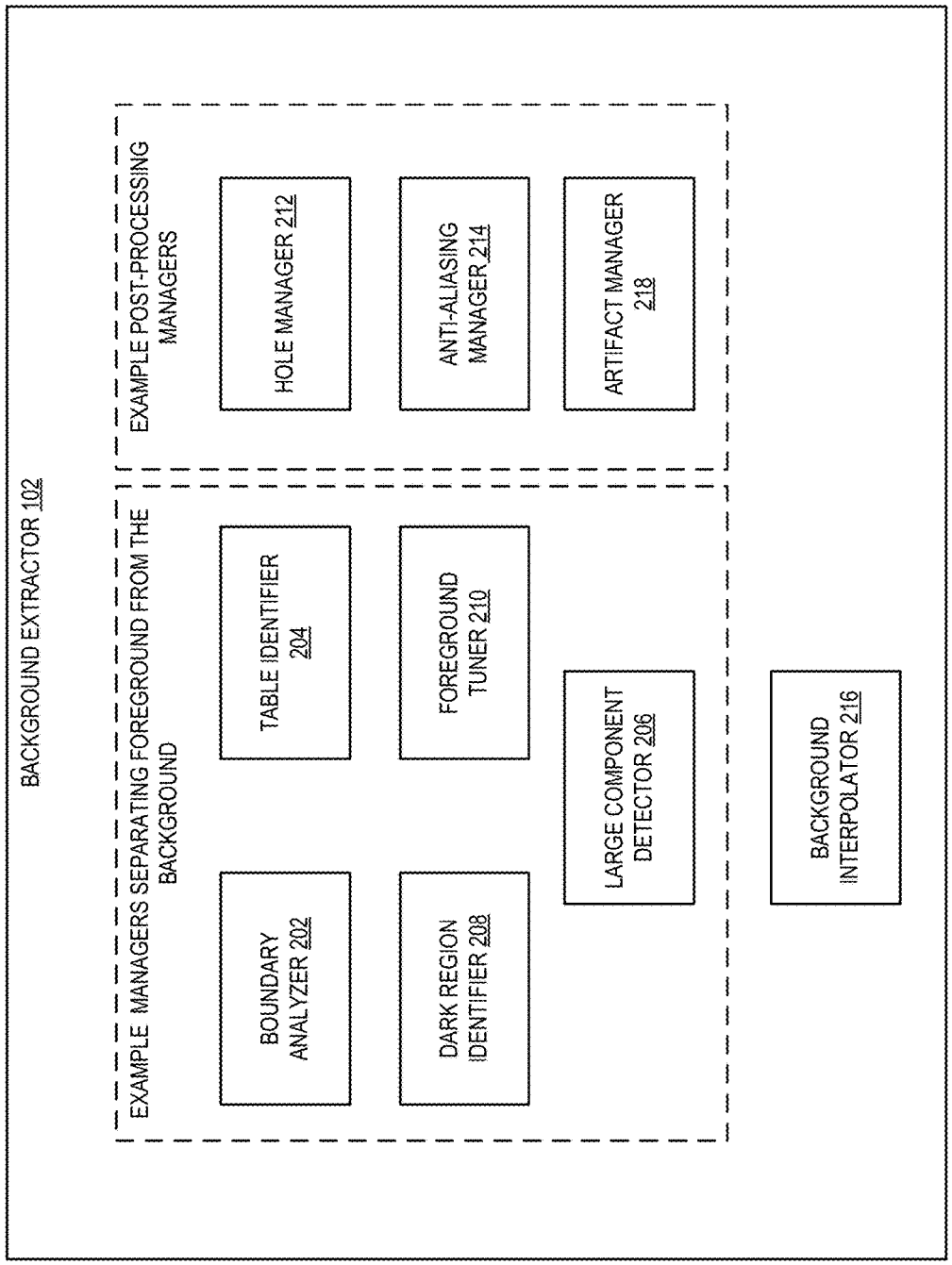
FIG. 2 illustrates a schematic diagram of the background extractor, in accordance with one or more embodiments.

FIG. 2 illustrates a schematic diagram of the background extractor 102, in accordance with one or more embodiments. At a high level, the background extractor 102 separates the foreground of the image from the background of the image (or vice-versa) to derive a source image background by filling pixels of objects of the foreground to a first value (e.g., black). In operation, the background extractor 102 computes the image background template using local features. Subsequently, the background extractor 102 strips the foreground objects (identified as pixels set to a first value) from the background by interpolating background pixels into the identified foreground objects.

Operations of the background extractor 102 are performed by various managers of the background extractor (e.g., boundary analyzer 202, table identifier 204, large component detector 206, dark region identifier 208, foreground tuner 210, hole manager 212, anti-aliasing manager 214, background interpolator 216, and artifact manager 218). Such managers are used separate the foreground from the background of an image, pre-process the image, post process the image, interpolate the source image background (otherwise referred to herein as a background template image), or some combination.

For example, an image may include one or more obstructions along a boundary of the image (e.g., the user captured a digital image including the user's finger, the user folded down a page resulting in a "dog ear" mark). The obstruction along the boundary of the image is part of foreground of the image. The background extractor 102 executes a boundary analyzer 202 to separate the finger (or other obstruction as part of the foreground) from the background.

The background extractor 102 is also configured to identify tables as foreground objects to avoid the background extractor 102 from identifying any shading of cells of the table as part of the background image. To do this, the background extractor 102 executes a table identifier 204.

An image may also contain large components (e.g., text, logos, etc.). The background extractor 102 executes a large component detector 206 to separate the large components (as part of the foreground) from the background.

In some embodiments, the identification of dark regions in the image can improve the identification of foreground objects because dark regions may be part of objects in the foreground. Accordingly, the background extractor 102 executes a dark region identifier 208 to generate a luminance map of the image (e.g., the input 120, the down-sampled input, the denoised input, the gray image, and/or some combination). Using the identified dark region, the foreground tuner 210 maps foreground pixels from one image to pixels in another image, effectively filling in any holes of the foreground objects using at least two images.

After one or more managers of the background extractor 102 have been deployed to separate the foreground from the background (and specifically, to set pixel values of foreground objects to a first value and/or set pixel values of the background to a second value), the background interpolator 216 of the background extractor 102 replaces pixels of the foreground with pixels of the background.

Figure 3:
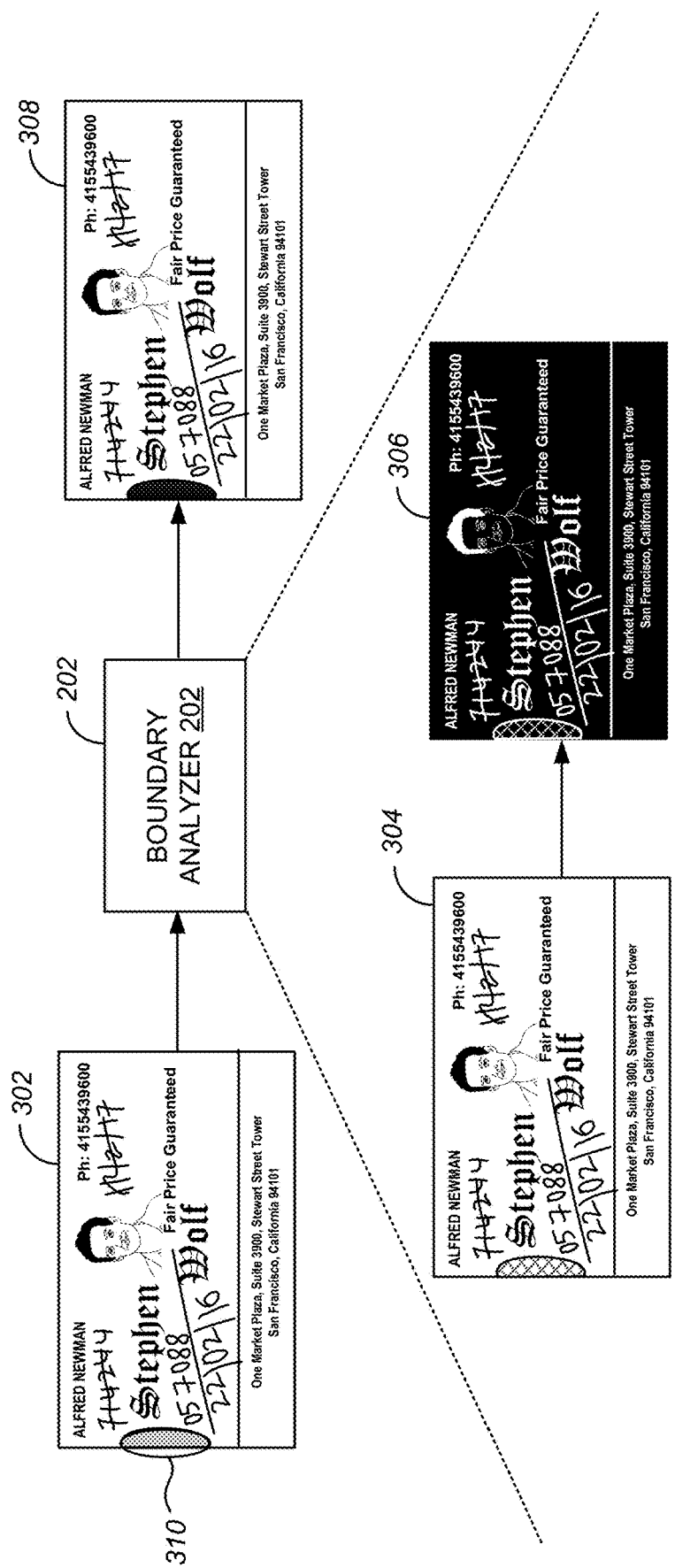
FIG. 3 illustrates an example implementation of the boundary analyzer, in accordance with one or more embodiments.

FIG. 3 illustrates an example implementation of the boundary analyzer 202, in accordance with one or more embodiments. The boundary analyzer 202 separates objects as part of the foreground of an image from the background of the image by analyzing a distance of the object from the boundary of the image. Objects are identified as being close to the image boundary (e.g., an obstructing finger) by identifying the object along the image boundary. As described, the boundary analyzer 202 compares boundary box heights and/or boundary box widths associated with objects in an image to a threshold, and determines whether the boundary box associated with the object is close to the image boundary using a threshold. However, it should be appreciated that the boundary analyzer 202 may compare other metrics associated with objects in the image to thresholds. Moreover, the boundary boxes associated with objects (or other metrics associates with objects) may be applied to one or more functions (instead of, or in addition to, thresholds).

As shown in FIG. 3, image 302 is a source image with a user's thumb obstructing the edge of the image at 310. The image 302 is fed to the boundary analyzer 202 to produce image 308. While image 302 is a source image, it should be appreciated that the boundary analyzer 202 may receive images in other forms (e.g., a preprocessed image, an image output from one or more managers of the background extractor 102, etc.). Image 308 illustrates how the boundary analyzer 202 may modify the source image 302. In particular, the thumb object (e.g., indicated by 310) is added to the gradient binarized image. That is, the boundary analyzer 202 filled in the pixels of the obstructing finger (e.g., the thumb) thereby adding an object (e.g., the thumb) to the foreground of the image.

The boundary analyzer 202 fills in pixels of obstructions along a boundary of the image by first computing an inverted gradient binarized image. First, the boundary analyzer 202 computes a binarized gradient image. Image 304 illustrates a binarized gradient image of image 302. As illustrated in image 304, the thumb is outlined with black pixels, but the inside of the thumb includes a majority of white pixels. In an invert operation, the boundary analyzer 202 changes all of the black pixels in the image to white pixels, and changes all of the white pixels in the image to black pixels. Accordingly, the boundary analyzer 202 fills in the white pixels inside of the thumb with black pixels, distinguishing the thumb from the background of the image. Image 306 illustrates the inverted binarized gradient image of 304. The boundary analyzer 202 employs any suitable inversion technique.

Subsequently, the boundary analyzer 202 performs a connected component analysis (CCA) on the inverted binarized gradient image. By performing CCA, the boundary analyzer 202 identifies and labels unique areas in the image, identifying unique components in the image. As described herein, a component is a cluster of pixels that share edges.

For each component in the image, the boundary analyzer 202 draws a boundary box around the component. For example, the boundary analyzer 202 can employ any object detection technique to draw a boundary box around the component. By determining a boundary box around each component, the boundary analyzer 202 determines a boundary box height and a boundary box width associated with each component.

The boundary analyzer 202 evaluates whether the boundary box width and/or the boundary box height satisfy a threshold. In some embodiments, the threshold is predefined (e.g., manually determined). In other embodiments, the threshold may be dynamically determined by the boundary analyzer 202 (e.g., estimating an optimal threshold over time). In an example embodiment, the threshold is predefined to 20%. Mathematically, this evaluation is expressed according to the size constraints of Expressions (1)-(2) below:

$$\text{Bounding Box Height} \leq \frac{(\text{threshold}\% * \text{Image Height})}{100} \quad (1)$$

$$\text{Bounding Box Width} \leq \frac{(\text{threshold}\% * \text{Image Width})}{100} \quad (2)$$

If the boundary box height and/or boundary box width do not satisfy the threshold, then the boundary analyzer 202 analyzes a next component of the image. If the boundary box height and/or boundary box width satisfy a threshold, then a closeness of the boundary box associated with the component is evaluated. Closeness is defined as a threshold distance between the image boundary and the boundary box. In some embodiments the threshold is predefined. In other embodiments, the threshold is dynamically determined. In an example embodiment, the boundary closeness value is defined as 5% of the image dimension. Mathematically, the boundary closeness value is determined according to Equation (1) below:

$$\text{Boundary Closeness Value} = \frac{\text{Min}(\text{Image Width, Image Height}) * \text{threshold}\%}{100} \quad (1)$$

If the component is close to the boundary (e.g., within the boundary closeness value), then the boundary analyzer 202 determines that the boundary box of the component is close to the image boundary. If the boundary analyzer 202 determines that both the boundary box height and/or boundary box width of the component satisfy a threshold, and the boundary box of the component is close to the image boundary, then the boundary analyzer 202 fills in the pixels of the component, thereby adding the component to the binarized gradient image. In effect, the boundary analyzer 202 separates the foreground of an image (e.g., the source image) from the background of the source image by removing objects in the source image that are within a threshold distance from a boundary of the source image.

Figure 4:
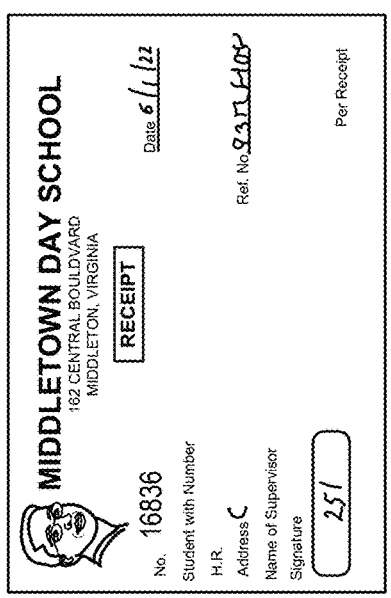
FIG. 4 illustrates an example implementation of the table identifier, in accordance with one or more embodiments.
Figure 4:
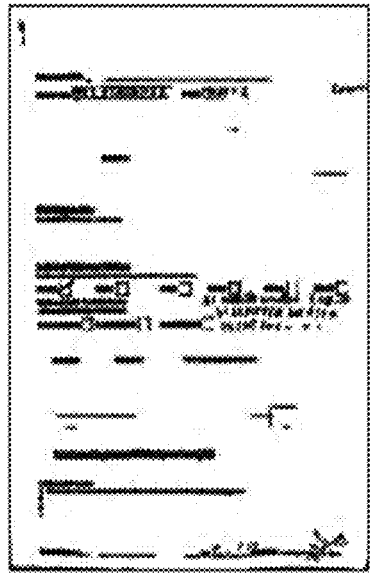
Figure 4:
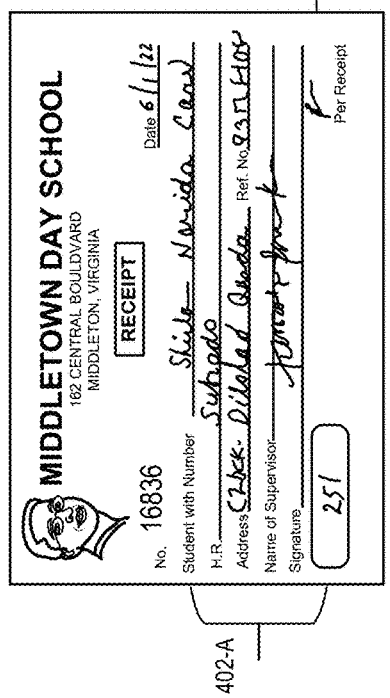
Figure 4:
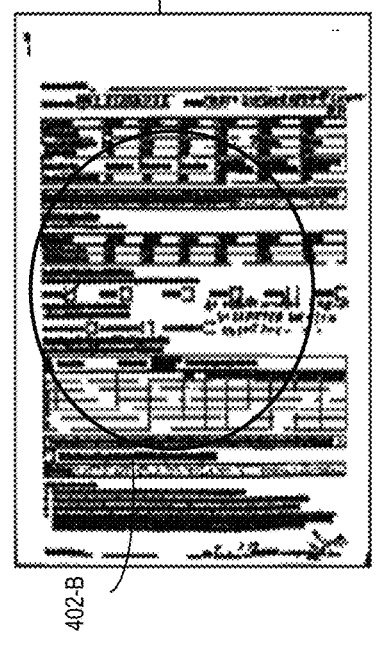

FIG. 4 illustrates an example implementation of the table identifier 204, in accordance with one or more embodiments. As shown in FIG. 4, two example images include table regions. Both image A and image B are binarized gradient images including table regions. However, it should be appreciated that the table identifier 204 may receive images in other forms (e.g., the source image, a preprocessed image, an image output from one or more managers of the background extractor 102, etc.). Image A includes a table region identified at 402-A and image B includes a table region identified at 402-B. The table region 402-A of image A is an example of an unbounded table region (e.g., lines without cells). The table region of 402-B of image B is an example of a bounded table region. Images with tables are fed to the table identifier 204 to remove the table regions. The output of the table identifier 204 are images A and B without table regions.

The table identifier 204 is configured to remove table regions from images, distinguishing the foreground object (e.g., table region) from the background. In operation, the table identifier 204 identifies table regions by identifying a table region larger than a threshold. The identified table regions are subsequently removed from the image. Removing such table regions (e.g., table lines, unbounded cells, etc.) differentiates the tables from the background of the image such that the cells of the table do not interfere with a determination of the background. In this manner, user's may create their own tables in the customizable template recommendation and any unused space of the table (e.g., variable number of columns, rows, and/or lines as compared to the source image) appears as background and not as empty table columns, rows, and/or lines. Accordingly, the background of the source image is faithfully reproduced behind a customizable table region.

The table identifier 204 compares boundary box heights and/or boundary box widths associated with objects in an image to a threshold. However, it should be appreciated that the table identifier 204 may compare other metrics associated with objects in the image to thresholds. Moreover, the boundary boxes associated with objects (or other metrics associates with objects) may be applied to one or more functions (instead of, or in addition to thresholds).

To remove table regions from an image, the table identifier 204 obtains an inverted binarized gradient image. For example, the table identifier 204 may first compute a binarized image and subsequently invert the image. Inverting the image includes changing all of the black pixels in the image to white pixels, and changing all of the white pixels in the image to black pixels (or vice-versa).

Subsequently, the table identifier 204 performs CCA on the inverted gradient binarized image. As described herein, by performing the CCA, the table identifier 204 identifies and labels unique areas in the image, identifying unique components in the image.

For each component of the image, the table identifier 204 determines a boundary box. For example, the table identifier 204 may employ any object detection technique to draw a boundary box around the component. By determining the boundary box around the component, the table identifier 204 determines the boundary box height and the boundary box width.

The boundary box height and/or the boundary box width are evaluated by the table identifier 204 using one or more thresholds. In some embodiments, the threshold is predefined (e.g., manually determined). In other embodiments, the threshold may be dynamically determined by the table identifier 204 (e.g., estimating an optimal threshold over time). In an example embodiment, the threshold is predefined to 70%. Mathematically, this evaluation is expressed according to the size constraints of Expressions (3)-(4) below:

$$\text{Bounding Box Height} \leq \frac{(\text{threshold\%} * \text{Image Height})}{100} \quad (3)$$

$$\text{Bounding Box Width} \leq \frac{(\text{threshold\%} * \text{Image Width})}{100} \quad (4)$$

If the boundary box height and/or boundary box width do not satisfy the threshold, then the table identifier 204 analyzes a next component of the image. If the boundary box height and/or boundary box width satisfy a threshold, then the table identifier 204 removes the component associated with the boundary box from the gradient binarized image. In this manner, the foreground object (e.g., a table) is separated from the background. In effect, the table identifier 204 separates the foreground of the source image from the background of the source image by removing an object in the source image satisfying a threshold.

Figure 5:
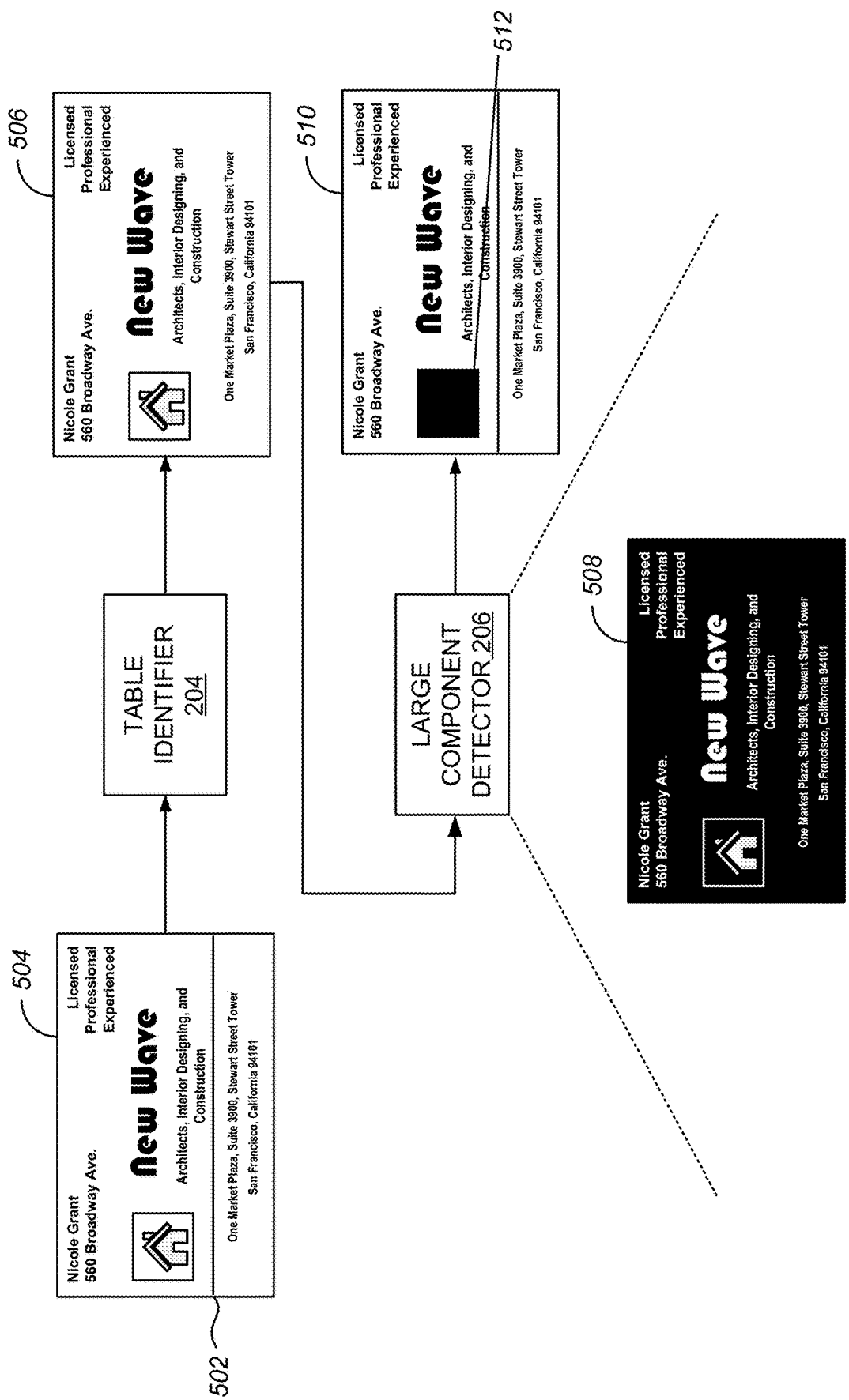
FIG. 5 illustrates an example implementation of a large component detector, in accordance with one or more embodiments.

FIG. 5 illustrates an example implementation of a large component detector 206, in accordance with one or more embodiments. The large component detector 206 fills the empty space of large objects/components. Filling in the pixels of large objects/components distinguishes the foreground from the background such that the accuracy of the resulting background template image improves. In operation, the large component detector 206 separates the foreground of the source image from the background of the source image by removing an object in the source image satisfying a threshold. In some embodiments, the large component detector 206 fills in empty space of components after table regions have been removed. For example, the large component detector 206 receives an output image from the table identifier 204. In this way, the large component detector 206 does not fill in cells of a table region. As shown, the large component detector 206 is configured to receive an image output from the table identifier 204. However, in alternate embodiments, the large component detector 206 operates on a source image, a preprocessed image, or an image output from one or more other managers of the background extractor 102.

As described, the large component detector 206 compares boundary box heights and/or boundary box widths associated with objects in an image to a threshold. However, it should be appreciated that the large component detector 206 may compare other metrics associated with objects in the image to thresholds. Moreover, the boundary boxes associated with objects (or other metrics associates with objects) may be applied to one or more functions (instead of, or in addition to thresholds).

In an example embodiment, a first image 504 is fed to the table identifier 204. Image 504 is a binarized gradient image. However, it should be appreciated that the table identifier 204 may receive images in other forms (e.g., the source image, a preprocessed image, an image output from one or more managers of the background extractor 102, an image output from the text information extractor 106, etc.). The image 504 is an image including an unbounded table region identified by 502. As described herein, the table identifier 204 removes table regions in the image. As a result, the table identifier 204 produces image 506. As shown in image 506, the table region has been removed.

The image 506 is fed into the large component detector 206. The large component detector 206 computes an inverted binarized gradient image. As described herein, inverting the image includes changing all of the black pixels in the image to white pixels, and changing all of the white pixels in the image to black pixels (or vice-versa). Image 508 is an example of an inverted gradient binarized image after the table regions have been removed.

Next, the large component detector 206 performs CCA on the inverted image. As described herein, by performing the CCA, the large component detector 206 identifies and labels unique areas in the image, identifying unique components in the image.

For each component of the image, the large component detector 206 determines a boundary box. For example, the large component detector 206 may employ any object detection technique to draw a boundary box around the component. By determining the boundary box around the component, the large component detector 206 determines the boundary box height and the boundary box width.

The boundary box height and/or the boundary box width are evaluated by the large component detector 206 using one or more thresholds. In some embodiments, the threshold is predefined (e.g., manually determined). In other embodiments, the threshold may be dynamically determined by the large component detector 206 (e.g., estimating an optimal threshold over time). In an example embodiment, the threshold is predefined to 15%. Mathematically, this evaluation is expressed according to the size constraints of Expressions (5)-(6) below:

$$\text{Bounding Box Height} \leq \frac{(\text{threshold\%} * \text{Image Height})}{100} \qquad (5)$$

$$\text{Bounding Box Width} \leq \frac{(\text{threshold\%} * \text{Image Width})}{100} \qquad (6)$$

If the boundary box height and/or boundary box width do not satisfy the threshold, then the large component detector 206 analyzes a next component of the image. If the boundary box height and/or boundary box width satisfy a threshold, then the large component detector 206 adds the component associated with the boundary box to the gradient binarized image. By adding the component to the gradient binarized image, pixels of the large component are filled in. Image 510 illustrates the output of the large component detector 206 where the pixels of large components are filled in (indicated at 512).

Figure 6:
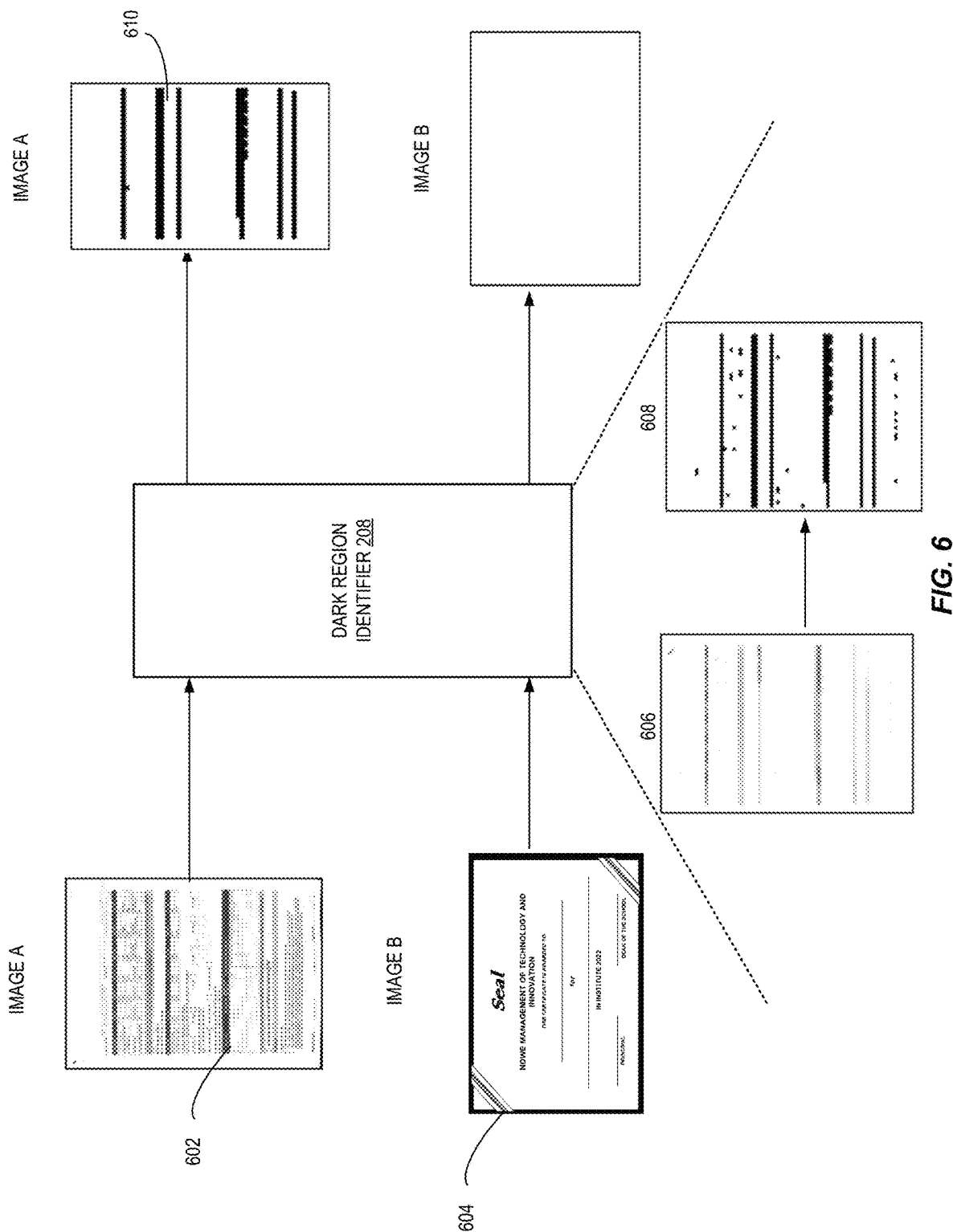
FIG. 6 illustrates an example implementation of a dark region identifier, in accordance with one or more embodiments.

FIG. 6 illustrates an example implementation of a dark region identifier 208, in accordance with one or more embodiments. The dark region identifier 208 identifies dark regions as part of the foreground of an image from the background of the image. To identify such dark regions, the dark region identifier 208 creates a luminance map. The luminance map is used to identify whether the dark regions of the luminance map are representative of dark regions in the foreground. As shown in FIG. 6, the dark region identifier 208 receives a source image (e.g., input 120). However in other embodiments, the dark region identifier 208 receives a preprocessed image or an image output from one or more other managers of the background extractor 102.

As described, the dark region identifier 208 compares boundary box heights and/or boundary box widths associated with objects in an image to a threshold. However, it should be appreciated that the dark region identifier 208 may compare other metrics associated with objects in the image to thresholds. Moreover, the boundary boxes associated with objects (or other metrics associates with objects) may be applied to one or more functions (instead of, or in addition to thresholds).

As shown in FIG. 6, two example images are fed to the dark region identifier 208. Image A includes a dark region indicated at 602. Image B indicates a dark region indicated at 604. As described herein, the dark region identifier 208 identifies dark regions in images because the dark regions in the image may be part of the foreground as opposed to part of the background. If the dark region is identified as part of the background, then the dark region identifier 208 removes the dark regions from the image, distinguishing the foreground (e.g., dark regions) from the background. Accordingly, a luminance map of the foreground objects is output from the dark region identifier 208. Such luminance map is used in further downstream processing, as described herein.

The dark region identifier 208 computes a binarized luminance map. A luminance map may be defined as a gray scale bitmap whose height and width are similar to the input image (otherwise referred to herein as the source image). The luminance map is created by defining a window for a pixel and determining the max luminescent value for the window. That luminance value is the pixel value for that window of pixels. The dark region identifier 208 may determine the luminance map using any one or more algorithms. For example, the dark region identifier 208 may take a measure of luminance using the Y channel in the YCbCr color space or the L channel in the CIE-Lab color space. An example of a luminance map of image A is shown in image 606. Once a luminance map is created, the dark region identifier 208 binarizes the image using any suitable thresholding technique. An example of a binarized luminance map of image A is shown in image 608.

Subsequently, the dark region identifier 208 performs dilation. Dilation can be used to repair breaks in image objects and/or repair intrusions in image objects. The pixels that are added to the boundary of the object are based on a size of a structuring element. The structure element traverses the image such that each pixel in the structure element is compared to the other pixels in the structure element. In some embodiments, the structure element may be a size of 3×3.

Components of the dilated luminance map are determined as a result of the dark region identifier 208 performing CCA on the dilated luminance map. As described herein, by performing CCA, the dark region identifier 208 identifies and labels unique areas in the image, identifying unique components in the image.

For each component in the image, the dark region identifier 208 determines a boundary box. For example, the dark region identifier 208 may employ any object detection technique to draw a boundary box around the component. By determining the boundary box around the component, the dark region identifier 208 determines the boundary box height and the boundary box width.

Next, the dark region identifier 208 evaluates whether the boundary box of each component touches the image boundary. If the boundary box touches the image boundary, then it is assumed that the component associated with the boundary box is part of the background. Accordingly, the dark region identifier 208 removes the component from the binarized luminance map. As shown, the output of the dark region identifier 208 for image B is blank because the dark region identifier 208 determined that the dark region 604 of image B is part of the background. As part of the background, the dark region was removed.

If the boundary box does not touch the image boundary, then it is assumed that the component associated with the boundary box is not part of the background. Responsive to determining that the component associated with the boundary box is not part of the background, the dark region identifier 208 evaluates whether the boundary box width and the boundary box height satisfy one or more thresholds. In some embodiments, the thresholds are predefined (e.g., manually determined). In other embodiments, the thresholds are dynamically determined (e.g., estimating an optimal threshold over time). In some embodiments, the threshold associated with the boundary box width is the same as the threshold associated with the boundary box height. In other embodiments, the threshold associated with the boundary box width is different from the threshold associated with the boundary box heigh. In an example embodiment, the threshold associated with the boundary box width is 70% of the image width and the threshold associated with the boundary box height is 15% of the image height. Mathematically, this evaluation is expressed according to the size constraints of Expressions (7)-(8) below:

$$\text{Bounding Box Height} \geq \frac{(\text{bounding box height threshold\%} * \text{Image Height})}{100} \text{ AND} \qquad (7)$$

$$\text{Bounding Box Width} \leq$$

-continued $$\text{Bounding Box Width} \geq \frac{(\text{bounding box width threshold\%} * \text{Image Width})}{100} \quad (8)$$

$$\text{Bounding Box Width} \geq \frac{(\text{bounding box width threshold\%} * \text{Image Width})}{100} \text{ AND}$$

$$\text{Bounding Box Height} \leq \frac{(\text{bounding box height threshold\%} * \text{Image Height})}{100}$$

If neither Expression (7) nor Expression (8) are satisfied, then the dark region identifier 208 removes the component from the binarized luminance map, indicating that the component is part of the background. If either Expression (7) or Expression (8) are satisfied (including both the boundary box width condition and the boundary box height condition), then the component is preserved in the binarized luminance map, indicating that the component is part of the foreground. As shown, the output of the dark region identifier 208 for image A are dark regions 610 of a post-processed dilated luminance map corresponding to the dark regions 602 of image A. The dark regions 610 have been identified as part of the foreground because the dark regions 610 satisfy a threshold size requirement and do not touch the image boundary.

Figure 7:
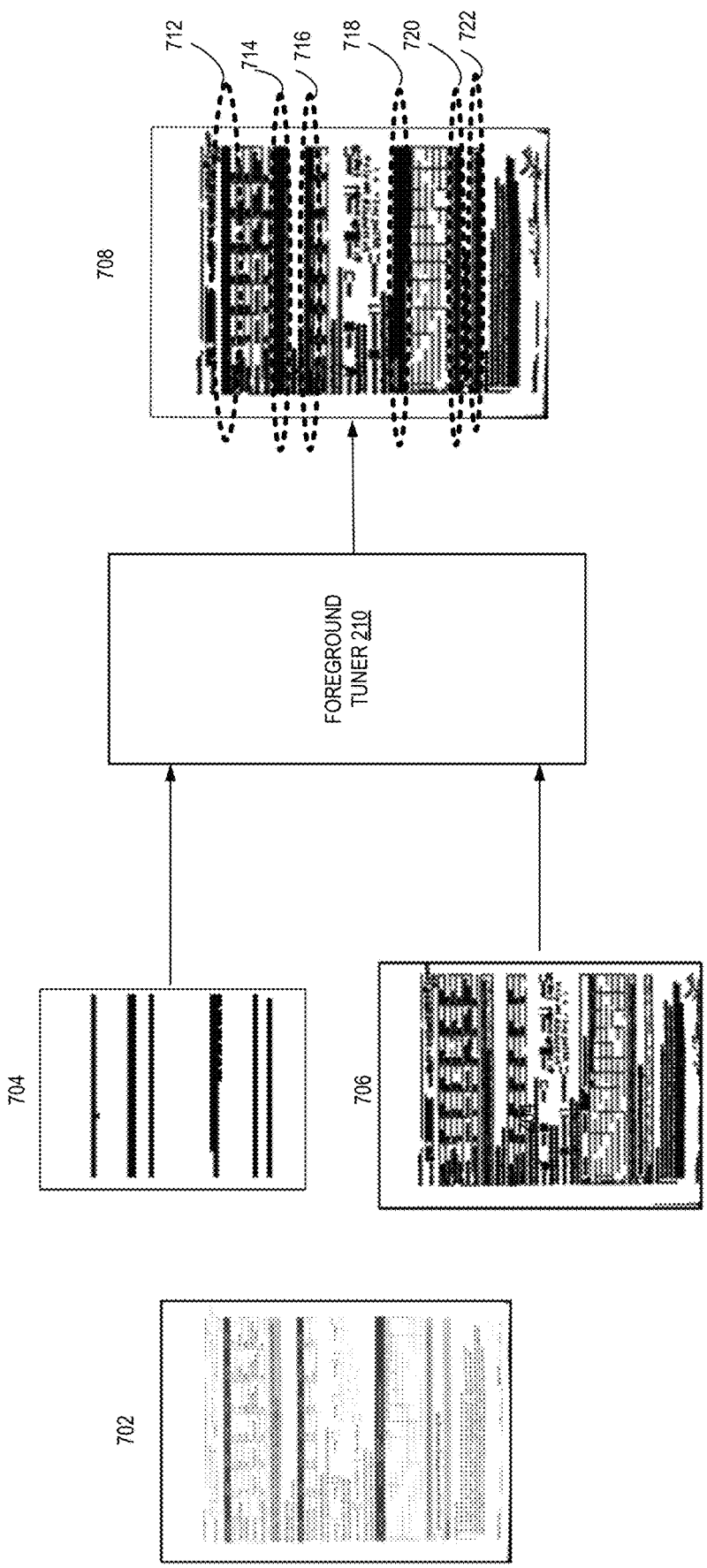
FIG. 7 illustrates an example implementation of the foreground tuner, in accordance with one or more embodiments.

FIG. 7 illustrates an example implementation of the foreground tuner 210, in accordance with one or more embodiments. The foreground tuner 210 tunes identified foreground regions using two or more images output from two or more managers of the background extractor 102. In particular, the foreground tuner 210 maps foreground pixels from one image to pixels in another image, effectively filling in any holes of foreground objects using two images. In FIG. 7, the foreground tuner 210 receives an image output from the dark region identifier 208 and an image output from the large component detector 206. In the particular example of FIG. 7, separating the foreground of the source image from the background of the source image comprises generating a luminance map of the source image and removing a pixel of the luminance map, wherein the removed pixel of the luminance map corresponds to a pixel of an object in the foreground of the source image. It should be appreciated that while the foreground tuner 210 is described as filling in black pixels, any pixel set to a value may be distinguished from other pixels set to a second value and filled in.

As illustrated in FIG. 7, a source image 702 has been processed by both the dark region identifier 208 (resulting in output image 704, which is a luminance map identifying dark regions as part of the foreground) and the large component detector 206 (resulting in output image 706, which is a gradient binarized image of filled-in space of large foreground components).

The foreground tuner 210 then modifies a first image (e.g., image 706) according to a second image (e.g., image 704). For example, the second image may be used to fill in pixels of the foreground corresponding to the first image. In this manner, the foreground tuner 210 modifies the foreground components in the binarized image by further filling in such components using the luminance map. In alternate embodiments, the foreground tuner 210 generates a new image overlaying both the first image and the second image.

In particular, the foreground tuner 210 identifies a pixel in the first image and a corresponding pixel in the second image. Subsequently, the foreground tuner 210 determines whether the pixel in the second image is black (or a first value). If the pixel in the second image is black, then the foreground tuner 210 fills in the corresponding pixel in the first image. If the pixel in the second image is not black, then the foreground tuner 210 evaluates a next pixel in the first image to a next corresponding pixel in the second image.

Image 708 illustrates an example image resulting from comparing image 704 to image 706. As shown by 712-722, foreground regions of image 706 were filled in by the luminance map of image 704. In this manner, foreground regions of image 706 were further tuned by filling in pixels of the foreground regions using the dark regions of image 704.

After the image has been processed by one or more manager of the background extractor 102 (e.g., large objects removed, obstructions removed, tables removed, denoised, down-sampled, etc.), one or more managers of the background extractor 102 may post-process the image. For example, one or more managers may up-sample the image.

Moreover, one or more managers may remove aliasing in an image. Aliasing is a visual distortion that may occur when an image resolution is too low (e.g., the image is insufficiently sampled). For example, when an image is scanned, the digital image resulting from the scan may be a lower quality than the original image, resulting in blurred and/or jagged edges in the digital image.

Referring back to FIG. 2, the anti-aliasing manager 214 smooths aliasing using any anti-aliasing technique such as a filter and/or a morphological operation. For example, dilation is a morphological operation that adds pixels to the boundary of an object. Dilation can be used to repair breaks in image objects and/or repair intrusions in image objects. The pixels that are added to the boundary of the object are based on a size of a structuring element. The structure element traverses the image such that each pixel in the structure element is compared to the other pixels in the structure element. In some embodiments, the structure element may be a size of 3×3.

Figure 8:
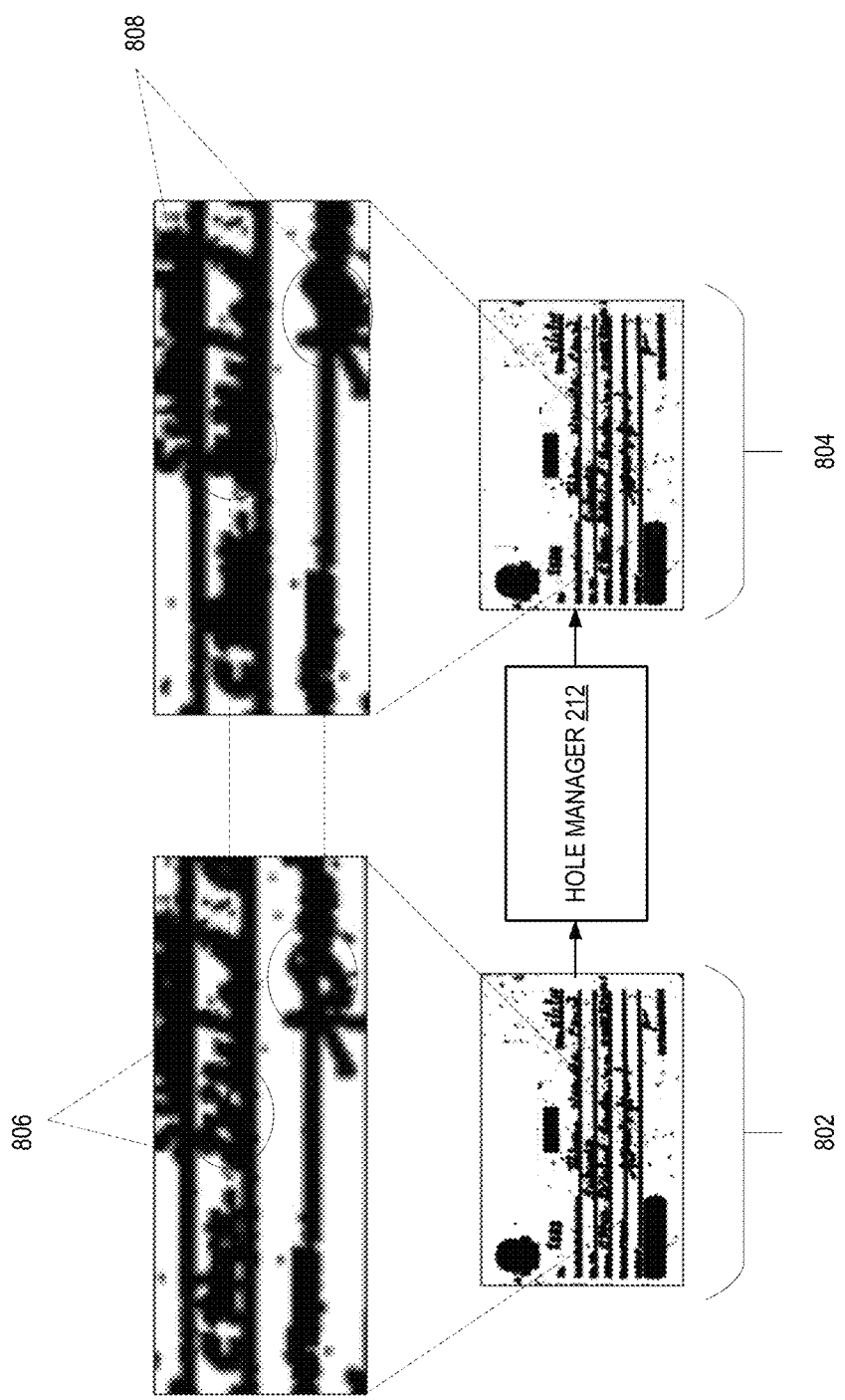
FIG. 8 illustrates an example implementation of the hole manager, in accordance with one or more embodiments.

FIG. 8 illustrates an example implementation of the hole manager 212, in accordance with one or more embodiments. The hole manager 212 is configured to post-process the image by identifying and filling in holes of foreground objects in an image. Computing a binarized gradient of an image may result in small holes (or gaps in foreground objects). Filling in such holes in the foreground object increases in accuracy of the separation of foreground objects from the background. It should be appreciated that although the hole manager 212 is described as filling in black pixels, any pixel set to a first value may be distinguished from other pixels set to a second value and filled in. As described, the hole manager 212 compares boundary box heights and/or boundary box widths associated with objects in an image to a threshold. In particular, a number of pixels of a first value in a component associated with an object are compared to a threshold. However, it should be appreciated that the hole manager 212 may compare other metrics associated with objects in the image to thresholds. Moreover, the boundary boxes associated with objects (or other metrics associated with objects) may be applied to one or more functions (instead of, or in addition to, thresholds).

As shown in FIG. 8, a gradient binarized image 802 is fed to the hole manager 212 to generate image 804. In particular, text of image 802 is magnified to illustrate holes 806 in image 802. While image 802 is a gradient binarized image, it should be appreciated that the hole manager 212 may receive images in other forms (e.g., a preprocessed image, an image output from one or more managers of the background extractor 102, etc.).

The hole manager 212 determines an inverted gradient binarized image from image 802. As described herein, inverting the image includes changing all of the black pixels in the image to white pixels, and changing all of the white pixels in the image to black pixels. Subsequently, the hole manager 212 performs a CCA on the inverted binarized gradient image. By performing CCA, the hole manager 212 identifies and labels unique areas in the image, identifying unique components in the image.

For each component in the image, the hole manager 212 determines a number of black pixels in the component. For example, the hole manager 212 may count the number of black pixels in the component using any suitable mechanism. Subsequently, the hole manager 212 compares the identified number of black pixels of the component to a threshold. In some embodiments, the threshold is predefined (e.g., manually determined). In other embodiments, the threshold is dynamically determined over time. If the number of pixels satisfies the threshold, then the hole manager 212 keeps the component. If the number of pixels does not satisfy the threshold, then the hole manager 212 removes the component from the inverted gradient binarized image. After the hole manager 212 has analyzed each component in the image (by counting and comparing the number of pixels of a specific value of each component to a threshold), the hole manager 212 inverts the image (and, in some embodiments, performs additional post-processing steps).

In a non-limiting embodiment, a threshold is set to 50 black pixels. If the hole manager 212 determines that the number of black pixels is less than or equal to 50 black pixels, the hole manager 212 removes the component. If the hole manager 212 determines that the number of pixels is greater than 50 black pixels, then the hole manager 212 keeps the component in the inverted binarized image.

Figure 9:
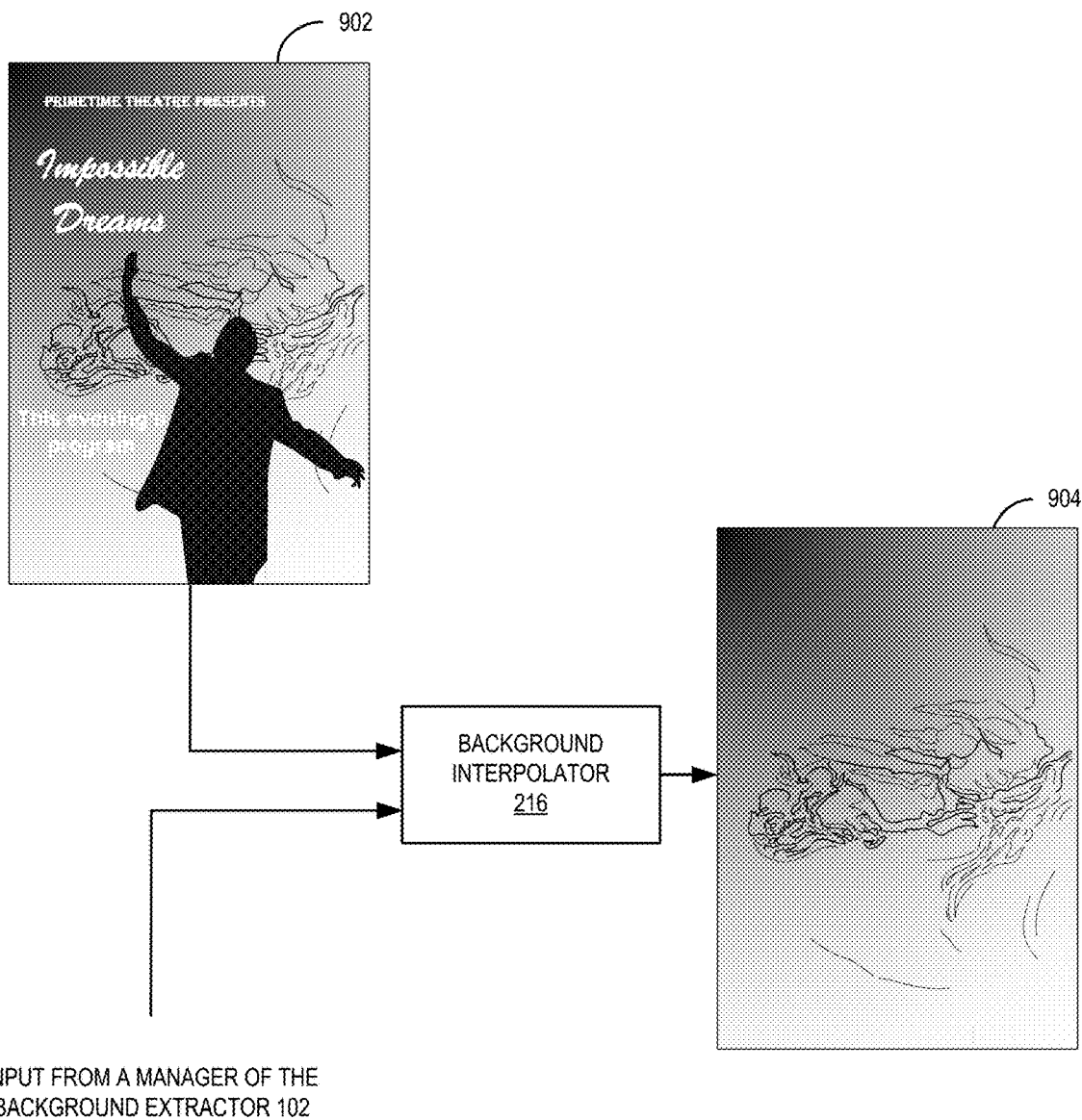
FIG. 9 illustrates an example implementation of the background interpolator, in accordance with one or more embodiments.

FIG. 9 illustrates an example implementation of the background interpolator 216, in accordance with one or more embodiments. As illustrated in FIG. 9, image 902 is a source image. A corresponding image (not shown) is also fed to the background interpolator 216. The corresponding image (not shown) is the image operated on by the one or more managers of the background extractor 102. Each of the managers of the background extractor 102 operate on the source image (e.g., image 902) to set pixels of the foreground to a first value (e.g., black) and pixels of the background to a second value (e.g., white) by separating objects of the foreground from the background.

The background interpolator 216 interpolates background pixels into foreground objects the identified by one or more managers of the background extractor 102. Specifically, the background interpolator 216 interpolates an image background using the identified foreground (and the objects of the foreground). In this manner, the pixels of the foreground are replaced with pixels of the background. Specifically, a foreground pixel (e.g., a pixel that has been set to black or another value) in a gradient binarized image is replaced with an RGB value of a closest background pixel in the original image. The background interpolator 216 determines the closest background pixel in the original image by finding the closest background pixel in the gradient binarized image (e.g., a pixel that has been set to white or another value). The closest background pixel is found by iteratively evaluating a value of pixels located radially around the identified foreground pixel. Subsequently, the location of the closest background pixel in the gradient binarized image is mapped to the location of a background pixel in the original image. As a result, the background interpolator 216 produces a source image background 904. The source image background (or the image with the foreground removed) is also referred to herein as the background template image.

In operation, first, the background interpolator 216 obtains an image that has been processed by one or more managers separating the foreground from the background (e.g., the boundary analyzer 202, the table identifier 204, the dark region identifier 208, the foreground tuner 210, and/or the large component detector 206) and the corresponding original source image (e.g., input 120). In some embodiments, the background interpolator 216 obtains a processed source image. For example, the source image may be down-sampled, denoised, and the like.

Subsequently, the background interpolator 216 selects a pixel set to a first value in a first image (e.g., the binarized gradient image). In other words, the background interpolator 216 selects a black pixel of the gradient binarized image. When the background interpolator 216 selects the pixel in the first image, the background interpolator 216 determines a coordinate position of the pixel set to the first value in the first image.

Pixels set to the first value in the first image are interpolated by the background interpolator 216 by identifying pixels set to a second value in the first image. That is, black pixels are interpolated using nearest neighborhood white pixels. In particular, lines are projected, by the background interpolator 216, from the selected pixel in the first image in a first direction. The first direction may be a diagonal direction, a horizontal direction, a vertical direction, and the like. The lines projected by the background interpolator 216 are straight lines positioned symmetrically around the selected pixel. The number of projected lines may be a predetermined number defined by one or more users and/or dynamically determined by the background interpolator 216 (e.g., estimating an optimal number of lines to project from the pixel over time).

The background interpolator 216 iteratively searches for a pixel set to a second value at varying positions along the lines projected from the pixel in the first direction. In this manner, the background interpolator 216 searches for the nearest neighbor pixel set to the second value (e.g., white). As described herein, in some implementations, white pixels represent background. As such, the background extractor searches for a pixel of the background (white) to replace with the pixel of the foreground (black).

In an example implementation, the background interpolator 216 searches for the pixel set to the second value by evaluating each pixel at a first position located radially along the projected lines. In some embodiments, the background interpolator 216 searches for pixels simultaneously. Searching for pixels in this manner improves the efficiency of the background interpolator searching for pixels set to the second value. If the value of the pixels at the first position located radially along the projected lines are set to the first value (e.g., black), then the background interpolator 216 simultaneously evaluates pixels at a second position located radially alone the projected lines, where the second position is farther away from the coordinate position of the first position. The background interpolator 216 may search different positions located radially along the projected lines, where each position is located farther away in coordinate space from the selected pixel in the first image. The background interpolator 216 continues searching positions located radially along the projected lines until a stopping criteria. The stopping criteria may be a number of positions searched, a maximum distance of a position searched, a time spent searching, and the like.

If the background interpolator 216 does not identify a pixel set to a second value along lines projected from the pixel in the first direction, then the background interpolator 216 projects new lines from the pixel in the first image in a second direction, where the second direction is different from the first direction. The newly projected lines by the background interpolator 216 (e.g., the projected lines in the second direction) are straight lines positioned symmetrically around the selected pixel. The number of newly projected lines may be a predetermined number defined by one or more users and/or dynamically determined by the background interpolator 216 (e.g., estimating an optimal number of lines to project from the pixel over time). Subsequently, as described herein, the background interpolator 216 iteratively searches for the pixel set to the second value at varying positions along the newly projected lines.

In an illustrative example, the background interpolator 216 may project lines diagonally (e.g., in a first direction) around the pixel in the first image during a first iteration of a search for a pixel set to a second value in the first image. After iteratively searching for a pixel set to the second value at varying positions along the projected lines in the first direction, the background interpolator 216 projects lines horizontally and vertically (e.g., in a second direction) in a second iteration of the search for the pixel set to the second value in the first image.

In another illustrative example, the background interpolator 216 may project lines diagonally (e.g., in a first direction) around the pixel in the first image at a first angle (e.g., 45 degrees), and in a subsequent iteration of a search for a pixel set to a second value in the first image, the background interpolator 216 may project lines diagonally at a second angle (e.g., 30 degrees) around the pixel in the first image.

New lines are projected and positions are searched radially along each line until the background interpolator 216 identifies a pixel set to a second value. When the background interpolator 216 identifies a pixel at a position that is set to a second value (e.g., white), then the background interpolator 216 determines the coordinate position of the pixel set to the second value in the first image.

The background interpolator 216 determines a corresponding pixel in the second image to the pixel identified as the nearest neighbor pixel in the first image. That is, the position of the white pixel in the gradient binarized image (e.g., the first image) is mapped to the position of a pixel in the source image.

Subsequently, the background interpolator 216 obtains the RGB value of the pixel in the second image using any suitable mechanism. By obtaining the RGB value of the pixel in the second image, the background interpolator 216 selects an RGB value of the background to replace the foreground. The RGB value of the pixel in the second image is subsequently set, by the background interpolator 216, to the value of the selected pixel in the first image to map an RGB value of a pixel of the background to an RGB value of a pixel of the foreground.

In an illustrative example, a pixel at coordinates (i,j) of the gradient binarized image is black. The background interpolator 216 searches for the nearest neighbor pixel that is white by iteratively evaluating a value of pixels located radially around the black pixel. When the background interpolator 216 finds a pixel that is white, then the background interpolator 216 identifies the coordinate location of the white pixel in the binarized gradient image (e.g., coordinates (m,n)). Subsequently, the background interpolator 216 considers the RGB value of the pixel at location (m,n) in the source image and uses the RGB value to replace the value of the pixel at coordinate (i,j) of the source image.

Each pixel set to the first value in the first image (e.g., black pixels or other pixels representing the foreground of the image) is replaced in the source image with the closest RGB value of a background pixel in the first image. In this manner, the background interpolator 216 replaces the foreground (e.g., a selected foreground pixel of a gradient binarized image corresponding to the foreground in the source image) with the background (e.g., a value of a pixel in the source image at the closest neighbor location determined using the gradient binarized image). In this manner, the background interpolator 216 determines the image background while still preserving the document fidelity.

Figure 10:
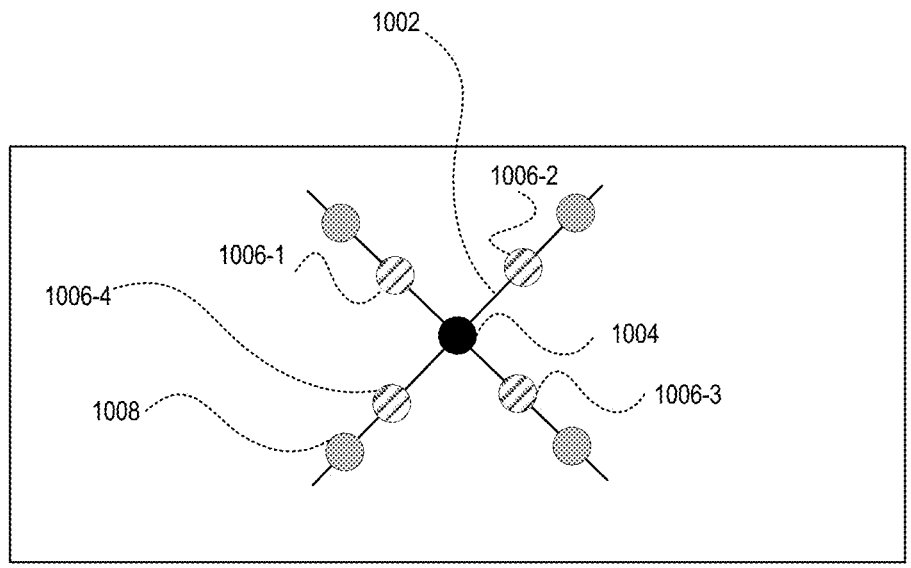
FIG. 10 illustrates an example of the background interpolator interpolating a value of a foreground pixel with a value of a background pixel, in accordance with one or more embodiments.
Figure 10:
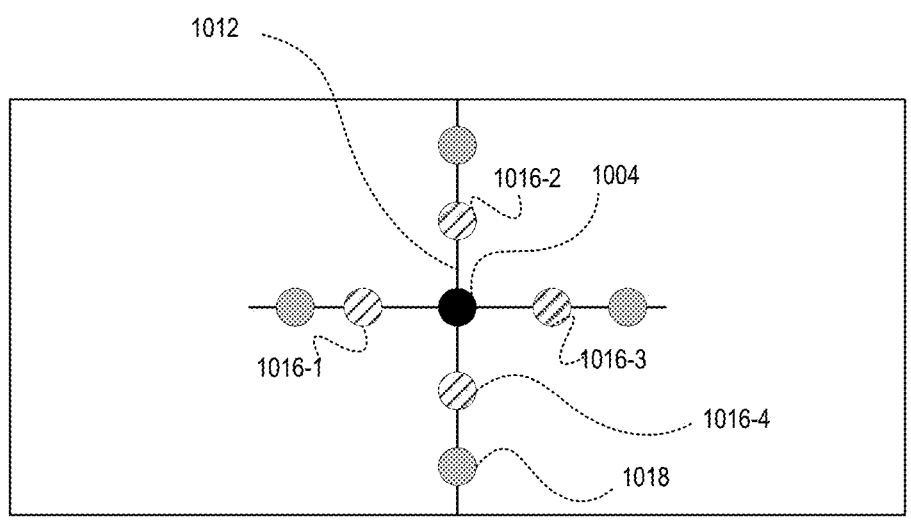

FIG. 10 illustrates an example of the background interpolator 216 interpolating a value of a foreground pixel with a value of a background pixel, in accordance with one or more embodiments. Pixel 1004 is the selected foreground pixel in the gradient binarized image (e.g., a pixel of a first value selected in a first image). Lines 1002 of 1010 illustrate four straight lines symmetrically projected diagonally around the pixel 1004.

As described herein, the background interpolator 216 is configured to iteratively search for a pixel set to a second value at varying positions along lines projected from the pixel in the first direction until a stopping criteria. Pixels 1006-1:1006-4 illustrate pixels at a first position along lines 1002 projected from the pixel 1004. The background interpolator 216 is configured to simultaneously evaluate the value of pixels 1006-1:1006-4 (herein referred to as pixel 1006) to determine whether the pixels at the first position of projected lines in the first direction are set to the second value (e.g., white).

For ease of illustration, only pixel 1008 is labeled in FIG. 10, however other pixels at the second position are shown. Pixel 1008 illustrates a pixel at a second position along lines 1002 projected from the pixel 1004. The background interpolator 216 simultaneously evaluates the value of each pixel at the second position along lines 1002.

As shown, pixels 1006 at the first position are closer to pixel 1004 than pixel 1008 at the second position (e.g., using Euclidean distance). As described herein, the background interpolator 216 is configured to simultaneously evaluate the value of the pixels at the first position before evaluating the pixel at the second position (and other subsequent positions). In this manner, the background interpolator 216 searches for the nearest neighbor pixel set to the second value (e.g., a white pixel). As described herein, the background interpolator 216 iteratively searches for a pixel set to a second value at different positions along lines projected from the pixel in the first direction until a stopping criteria. As shown, in the example implementation of FIG. 10, the stopping criteria is two positions (e.g., pixel 1006 at a first position and pixel 1008 at a second position).

The background interpolator 216 is configured to iteratively search for a pixel set to a second value along lines projected from the pixel in a second direction until a stopping criteria. Lines 1012 of 1020 illustrate four straight lines symmetrically projected horizontally and vertically around the pixel 1004. Pixels 1016-1:1016-4 illustrate pixels at a first position along lines 1012 projected from the pixel 1004. The background interpolator 216 is configured to simultaneously evaluate the value of pixels 1016-1:1016-4 (herein referred to as pixel 1016) to determine whether the pixels at the first position of projected lines in the second direction are set to the second value (e.g., white).

For ease of illustration, only pixel 1018 is labeled in FIG. 10, however other pixels at the second position are shown. Pixel 1018 illustrates a pixel at a second position along lines 1012 projected from the pixel 1004. The background interpolator 216 simultaneously evaluates the value of each pixel at the second position along lines 1012.

As shown, pixel 1016 at the first position is closer to pixel 1004 than pixel 1018 at the second position (e.g., using Euclidean distance). As described herein, the background interpolator 216 is configured to simultaneously evaluate the value of the pixels at the first position before evaluating the pixel at the second position (and other subsequent positions). In this manner, the background interpolator 216 searches for the nearest neighbor pixel set to the second value (e.g., a white pixel). The background interpolator 216 continues projecting lines in different directions and evaluating pixels at varying positions on the projected lines to determine the nearest neighbor pixel.

In some embodiments, the interpolation process may introduce artifacts. An artifact is a visual feature of an image that is not present in an original image. For example, pixels surrounding the interpolated pixels may include artifacts. An artifact manager 218 may be configured to minimize the artifacts by smoothing the image using any suitable technique. During the smoothing, only the pixels which are interpolated are smoothed. That is, the rest of the pixels of the image are not smoothed and their RGB values are the same as the source image. In some embodiments, the artifact manager 218 applies an average filter of window size 5 to smooth the image of the background.

Figure 11:
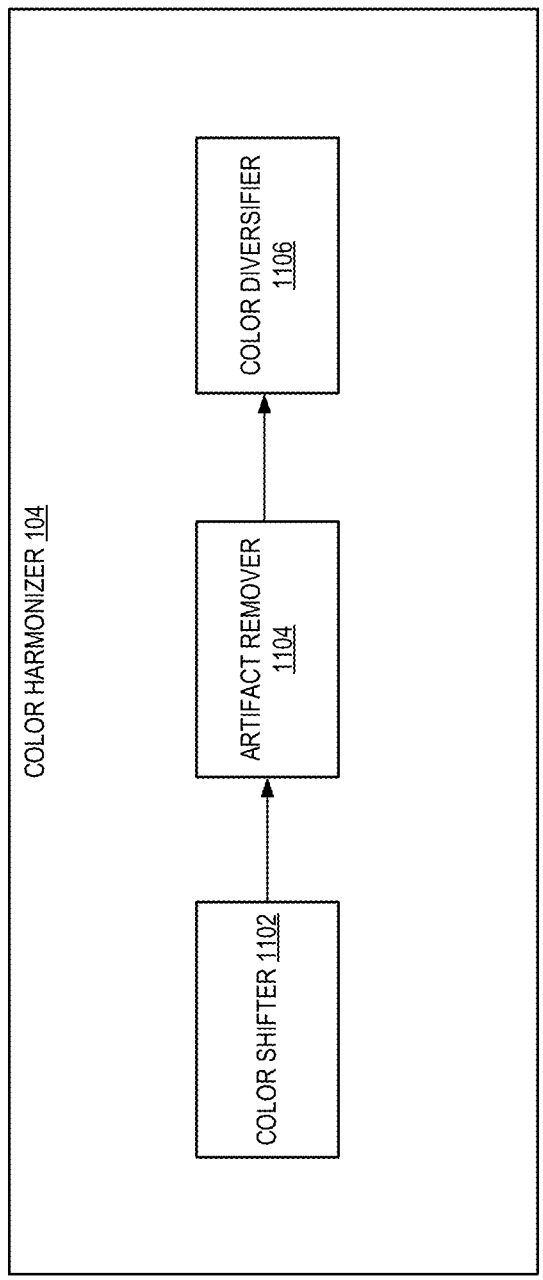
FIG. 11 illustrates a schematic diagram of the color harmonizer, in accordance with one or more embodiments.

FIG. 11 illustrates a schematic diagram of the color harmonizer 104, in accordance with one or more embodiments. At a high level, the color harmonizer 104 receives the background template image and determines a number of diverse color harmonized background template images. The number of diverse color harmonized template images may be a user-selected value and/or a predetermined value (e.g., a value defined by an administrator). Operations of the color harmonizer are performed by various manager of the color harmonizer 104 (e.g., the color shifter 1102, the artifact remover 1104, and the color diversifier 1106).

Harmonic colors are sets of colors that may be aesthetically pleasing based on color relationships in a color space. A color shifter 1102 produces color harmonized versions of the background template image that shift the colors of the background template image, while still remaining faithful to the original color palette.

In some embodiments, the color shifter 1102 determines a histogram of the background template image using any suitable method. A histogram is a representation of the frequency of colors in an image. Histograms are a tool used to capture variations of color changes in an image. The color shifter 1102 may determine the histogram by counting the number of pixels at particular RGB values.

A harmonic template is a template indicating ranges of visually aesthetic colors. The color shifter 1102 may be preconfigured with a number of harmonic templates. The color shifter 1102 fits the histogram of the background image template to a harmonic template by identifying a harmonic template with a minimum distance between the histogram of the background template image. In some embodiments, the color shifter 1102 also identifies an orientation of the closest harmonic template to identify an optimal harmonic scheme of the background template image. Each template may be rotated by an arbitrary angle to generate ranges of visually aesthetic colors in a different hue, while remaining true to the range of visually aesthetic colors in a particular template.

In a non-limiting example, the color shifter 1102 determines an optimal template and an optimal orientation (e.g., an angle of the template) that minimizes an optimal harmonic scheme function. That is, the histogram of the background template fits the optimal template. Responsive to a number of user-selected color harmonized templates, the color shifter 1102 modifies the orientation of the optimal template to generate additional color harmonized templates up to the number of user-selected color harmonized templates. For example, if a user requests five color harmonized templates, then the color shifter 1102 modifies the orientation of the optimal template five times to generate five color harmonized templates. As described herein, each modification of the orientation shifts the ranges of hues in in the optimal template. The color shifter 1102 shifts the orientation of the optimal template randomly, according to a predetermined sequence, and the like. In this manner, the color shifter 1102 generates a set of color harmonized templates corresponding to a set of color variations of the background template image by modifying the orientation of the optimal harmonic template.

In some embodiments, preserving the colors of the background template image by shifting the colors towards a closest harmonic template results in artifacts caused by "splitting" a contiguous region in the image. The splitting results from matching a region of the image to different sections of the harmonic template. That is, the color harmonization performed by the color shifter 1102 may not consider the spatial coherency of the pixels in the background template image such that discontinuous color artifacts manifest.

An artifact remover 1104 removes artifacts resulting from color harmonization, in accordance with one or more embodiments. Specifically, artifacts are removed by identifying strong gradient changes in the color harmonized templates. In operation, the artifact remover 1104 determines the similarity between the color harmonized templates and the source image. If the similarity does not satisfy a threshold, then the artifact remover 1104 discards the color harmonized template. In other words, if the similarity does not satisfy a threshold, then it is assumed that the color harmonized template includes an artifact that causes the color harmonized template to be dissimilar from the source input image.

As described, the artifact remover 1104 evaluates whether an image quality satisfies a threshold. However, it should be appreciated that the artifact remover 1104 may compare other metrics associated with images to thresholds. Moreover, the image quality (or other metrics associates with images) may be applied to one or more functions (instead of, or in addition to, thresholds).

As shown in FIG. 11, the artifact remover 1104 receives one or more color harmonized templates from the color shifter 1102. The artifact remover 1104 computes binarized image gradients for each color harmonized template received from the color shifter 1102. Additionally, the artifact remover 1104 receives the source image (e.g., input 120, a down-sampled input, a denoised input, a gray image, and/or some combination) and computes a binarized image gradient. In some embodiments, the color shifter 1102 processes the source input. In other embodiments, the artifact remover 1104 processes the source input.

The binarized image gradients for each of the color harmonized templates and/or source input is determined using any suitable mechanism. For example, the color shifter 1102 may process the images using a derivative filter. The gradient of the image represents the differences between each pixel and their adjacent pixels. The color shifter 1102 binarizes the gradient images using any suitable thresholding technique. The binarized gradient image is a tool used to extract contextual information in the image.

Subsequently, the color shifter 1102 is configured to compute the quality of each gradient binarized color harmonized template and the gradient binarized input image. In some embodiments, the color shifter 1102 determines a visual similarity of the input image and each of the color harmonized templates. Determining the visual similarity of the images may be accomplished by calculating the structural similarity (SSIM) index, for instance. The SSIM index is one example mechanism used to predict a perceived quality of an image.

Computing the SSIM index is accomplished using various windows of an image. For example, the SSIM index between two windows x and y of size N×N can be calculated as shown in Equation (2) below.

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)} \quad (2)$$

$$c_1 = (k_1 L)^2$$

$$c_2 = (k_2 L)^2$$

In Equation (2) above, $\mu_x$ is the average of window x, $\mu_y$ is the average of window y, $\sigma_x^2$ is the variance of window x, $\sigma_y^2$ is the variance of window y, $\sigma_{xy}$ is the covariance of windows x and y, $c_1$ and $c_2$ are variables to stabilize the division (as a result of a weak denominator), L is the dynamic range of pixel values (e.g., $2^{\#bits\ per\ pixel}-1$), and $k_1$ and $k_2$ are constants (such as 0.01 and 0.03 respectively). It should be appreciated that the SSIM index satisfies a symmetry condition (e.g., SSIM(x, y)=SSIM(y,x)).

The artifact remover 1104 determines a difference between the SSIM index of the source image and the SSIM index of each of the color harmonized templates. If the difference between the SSIM index of the input image and the SSIM index of a color harmonized template satisfies a threshold (e.g., is greater than a threshold), then the artifact remover 1104 discards the color harmonized template associated with the SSIM index of the color harmonized template. If the difference between the SSIM index of the input image and the SSIM index of a color harmonized template does not satisfy a threshold (e.g., is less than or equal to a threshold), then the artifact remover 1104 keeps the color harmonized template. That is, the artifact remover 1104 determines that the color harmonized template associated with the SSIM index of the color harmonized template used in the comparison does not contain an artifact.

The artifact remover 1104 compares the differences of SSIM indexes between each color harmonized template and the source image such that the artifact remover 1104 determines whether each color harmonized templates in a set of color harmonized templates includes an artifact. If the artifact remover 1104 determines that a color harmonized template includes an artifact (e.g., the quality of the color harmonized template is different from the quality of the input image), then the artifact remover 1104 discards the color harmonized template.

In operation, the artifact remover 1104 compares a visual similarity of each of a plurality of editable template images (e.g., color harmonized templates) to the editable template image (e.g., the background template). The artifact remover 1104 determines that a visual similarity of an editable template image satisfies a threshold, and subsequently prunes an editable template image of the plurality of editable template images.

A color diversifier 1106 identifies unique color harmonized templates from the set of computed color harmonized templates. When color harmonized templates are created, some of the color harmonized templates may appear visually similar. The color diversifier 1106 removes visually similar color harmonized templates, creating a set of unique (color diverse) color harmonized templates.

In operation, the color diversifier 1106 identifies clusters of visually similar color harmonized templates in the set of color harmonized templates. Subsequently, the color diversifier 1106 identifies a most unique color harmonized template in the cluster of visually similar color harmonized templates to generate a set of unique color harmonized templates.

First, the color diversifier 1106 clusters each of the color harmonized templates in the set of color harmonized templates, creating clusters of similar color harmonized templates. The color diversifier 1106 clusters (or otherwise associates similar color harmonized templates) using sequential clustering algorithms (e.g., k means clustering).

In operation, the color diversifier 1106 generates various centroids at random positions in space. Each of the centroids represent a unique color harmonized template. The color diversifier 1106 associates each color harmonized template in the set of color harmonized templates with a centroid. In this manner, the cluster of color harmonized templates associated with a centroid represents a group of visually similar color harmonized templates. Color harmonized templates are associated with the closest centroid (based on a relative distance measurement).

A distance between a color harmonized template and each of the various centroids is evaluated by the color diversifier 1106. The color diversifier 1106 moves the centroids to minimize an average distance of each of the color harmonized templates associated with the centroid. Each time the centroid moves, the color diversifier 1106 recalculates the distances between the color harmonized templates and the centroids. The color diversifier 1106 iterates the clustering process until a stopping criteria is satisfies (e.g., a predetermined number of color harmonized templates do not associate with a recently moved centroid, the sum of the distances is minimized, a maximum number of iterations is reached, etc.).

In some embodiments, the color diversifier 1106 adds centroids if a distance between one or more color harmonized templates and a centroid satisfies a threshold. That is, the color diversifier 1106 adds a centroid if a color harmonized template is too far from the other centroids, indicating that the color harmonized template may be unique from the other color harmonized templates.

In some embodiments, the color diversifier 1106 removes centroids if a distance between one or more color harmonized templates and multiple centroids satisfies a threshold. That is, the color diversifier 1106 removes a centroid if multiple centroids are close together, indicating that the color harmonized templates associated with the multiple centroids are not unique (e.g., the color harmonized templates are similar).

In some configurations, the color diversifier 1106 measures the distance between the color harmonized templates and the centroids using Euclidean distance. In some configurations, the color diversifier 1106 measures the distance between the color harmonized templates and the centroids based on the correlation of features of the color harmonized templates.

In some embodiments, the color diversifier 1106 treats each color harmonized template as a centroid. In these embodiments, the color diversifier 1106 clusters the color harmonized templates based on the distances of each color harmonized template to the other color harmonized templates. Distance measures may include, for example, the smallest maximum distance to other color harmonized templates, the smallest average distance to other color harmonized templates, and/or the smallest sum of squares of distances to other color harmonized templates.

In some embodiments, the clustering algorithm is based on pixel based similarity between the color harmonized templates. That is, each cluster contains color harmonized templates whose pixels are similar. For example, the color diversifier 1106 may create a similarity matrix and determine the similarity of each color harmonized template to other color harmonized templates based on pixel values. Accordingly, the color diversifier 1106 tracks the similarity scores between each of the color harmonized templates and other color harmonized templates in a similarity matrix. The more similar the pixels are of the color harmonized templates to other pixels of color harmonized templates, the higher the similarity score.

Subsequently, the color diversifier 1106 identifies a unique color harmonized templates in each cluster. For example, the color diversifier 1106 determines a histogram of each color harmonized template in the cluster. As described herein, a histogram is a representation of the frequency of colors in an image. Histograms are a tool used to capture variations of color changes in an image. The color diversifier 1106 may determine the histogram by counting the number of pixels at particular RGB values. In some embodiments, the color diversifier 1106 determines a histogram for a subregion of a color harmonized template (instead of the entire color harmonized template).

Computing the histogram difference is a tool used to measure the similarity between histograms. Accordingly, the color diversifier 1106 computes histogram differences between pairs of histograms. In this manner, the color diversifier 1106 detects dissimilarities (or similarities) between pairs of histograms. The evaluates of dissimilarities (or similarities) forms a robust measure of correspondence of color harmonized templates within a cluster. In some embodiments, the color diversifier 1106 computes histogram differences between histograms of subregions of color harmonized templates.

Identifying a maximum histogram difference represents a maximum difference between pairs of histograms. The histogram associated with the maximum histogram difference represents a color harmonized template that is the most diverse (or unique) of the cluster of color harmonized templates. Accordingly, the color diversifier 1106 identifies a unique color harmonized template of each cluster of color harmonized templates to generate a subset of unique color harmonized templates.

In an illustrative example, a cluster may include three color harmonized templates $H_1$, $H_2$, and $H_3$. The color diversifier 1106 may compute the histogram of color harmonized templates $H_1$, $H_2$, and $H_3$ (referring to step HH04 of FIG. HH). Subsequently, the color diversifier 1106 computes histogram differences between pairs of histograms (referring to step HH06 of FIG. HH). For example, the color diversifier 1106 computes a histogram difference between $(H_1, H_2)$, $(H_1, H_3)$ and $(H_2, H_3)$. The color diversifier 1106 may determine that histogram $H_1$ is associated with a maximum difference (e.g., the difference between $(H_1, H_2)$ and $(H_1, H_3)$ was higher than the difference between $(H_2, H_3)$). In this manner, the color diversifier 1106 identifies the color harmonized template $H_1$ as the most unique color harmonized template of the three color harmonized templates in the cluster.

Figure 12:
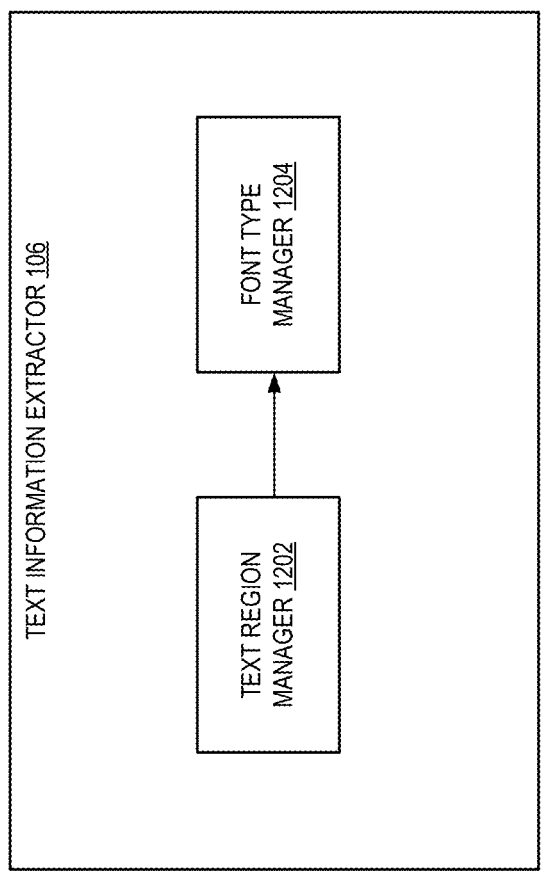
FIG. 12 illustrates a schematic diagram of the text information extractor, in accordance with one or more embodiments.

FIG. 12 illustrates a schematic diagram of the text information extractor 106, in accordance with one or more embodiments. As described herein, the text information extractor 106 receives the input image 120 and identifies text information (including text location information and/or font type information). In some embodiments, the text information extractor 106 is configured to preprocess the image (e.g., down-sample the image, denoise the image, etc.). The text information extractor 106 determines text location information (e.g., a location of text in the image) and font type information (e.g., a type of font in the image) using the text region manager 1202 and the font type manager 1204 of the text information extractor 106.

Figure 13:
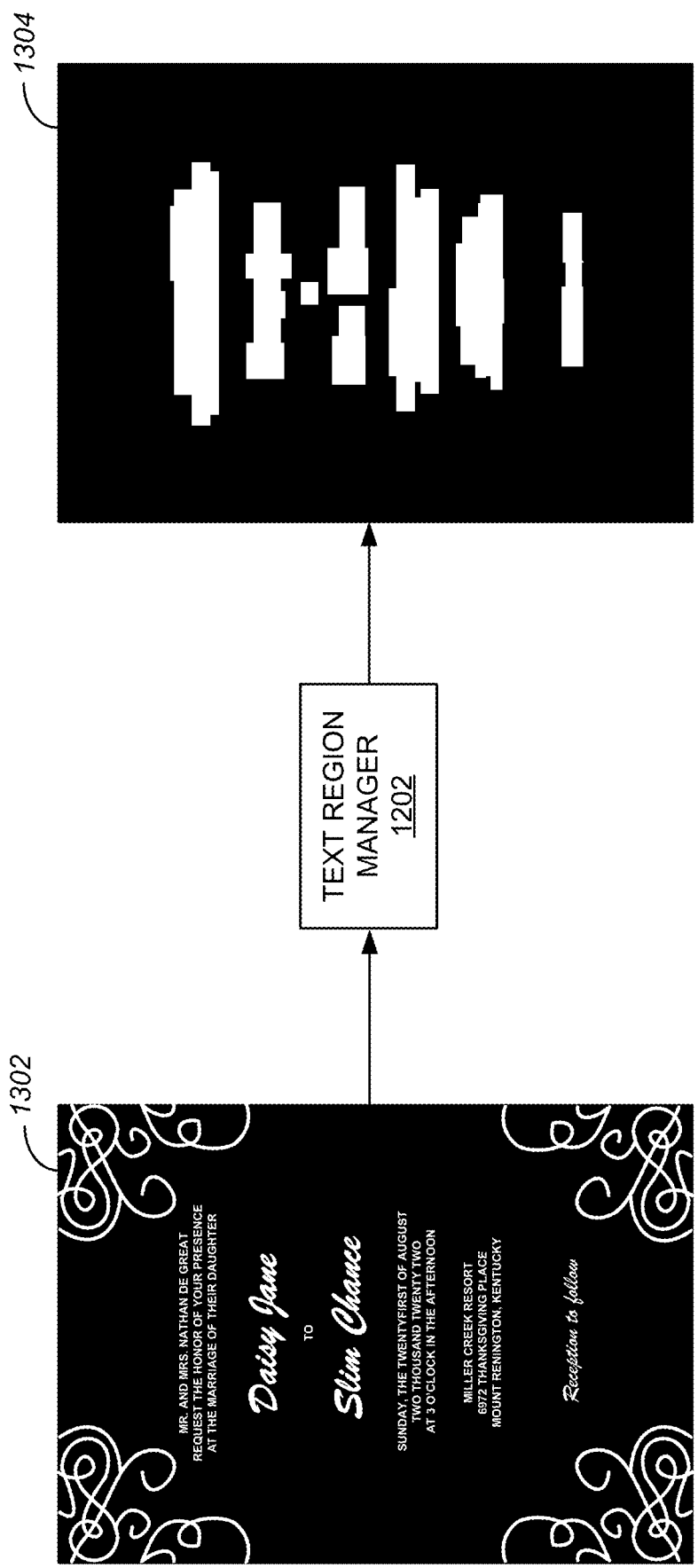
FIG. 13 illustrates an example of the text region manager, in accordance with one or more embodiments.

FIG. 13 illustrates an example of the text region manager 1202, in accordance with one or more embodiments. The text region manager 1202 identifies text location information. Text location information (also referred to herein as a text region) is a location of text in an image. Identified regions of text can include regions of printed text, handwritten text, and/or designer fonts (or some combination). As shown, the text region manager 1202 receives a source image (e.g., image 1302) and determines an image with masked text regions (e.g., image 1304).

In some embodiments, the source image 1302 is fed to a neural network executed by the text region manager 1202. A neural network includes a machine-learning model that can be tuned (e.g., trained) based on approximating unknown functions. In particular, a neural network includes a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In some embodiments, the neural network is a convolutional neural network. A convolutional neural network is configured to extract a feature map from an image. The convolutional neural network includes convolutional layers to extract and/or evaluate the features of the ingested image by applying various convolution operations. The convolutional layers are used to convolve a filter and/or kernel with the image according to the dimensions and operations of the filter, thereby generating a feature map extracting features from the image. Increasing the number of convolutional layers may increase the complexity of the features that may be tracked.

In some embodiments, the text region manager 1202 applies 16 convolution layers (e.g., 8 encoder layers and 8 decoder layers), 7 skip connections layers, and one Sobel convolution layer. Skip connection layers are used to feed the output of one layer to an input of another layer, skipping one or more layers of the neural network. These layers are advantageous as a tool to control the information passed to deep layers in the neural network, as the performance of deep neural networks may degrade with the increase in complexity (depth) of the neural network. Sobel convolution layers apply the Sobel filter to the image, which is useful in detecting edges by emphasizing edges in an image. The result of the applied convolutional neural network on the image is a probability of each pixel in the image belonging to a boundary in the image.

Figure 14:
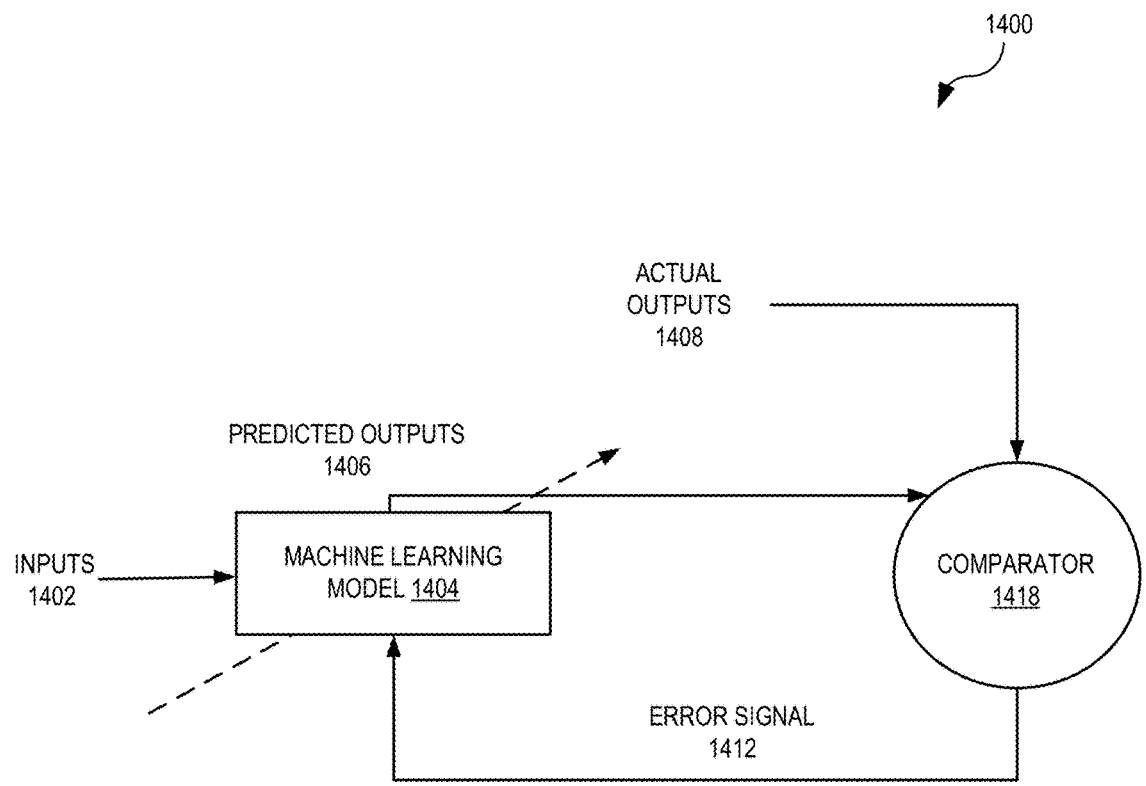
FIG. 14 illustrates a block diagram of a machine learning model trained using supervised learning, in accordance with one or more embodiments.

The convolutional neural network is trained to predict the probability of each pixel in the image belonging to a boundary using supervised learning. FIG. 14 illustrates a block diagram of a machine learning model (such as the neural network applied by the text region manager 1202) trained using supervised learning, in accordance with one or more embodiments. Supervised learning is a method of training a machine learning model given input-output pairs. An input-output pair is an input with an associated known output (e.g., an expected output). The machine learning model 1404 is trained on known input-output pairs such that the machine learning model 1404 can learn how to predict known outputs 1408 (e.g., a text region of an image, otherwise referred to herein as text location information) given known inputs N02 (e.g., an image with text). Once the machine learning model 1404 has learned to predict known input-output pairs, the neural network can operate on unknown inputs to predict an output.

The known outputs (otherwise referred to as labeled outputs, expected outputs, etc.) may be manually annotated documents (e.g., images, files, etc.). For example, a user may scan a document and identify text regions present in the document by manually selecting such regions. In a particular example, one or more optical character recognition algorithms (such as those provided by Adobe Acrobat™) may be used such that a user can interact with the document, selecting text regions of the document.

Additionally or alternatively, the known outputs may be automatically annotated documents. For example, the text region manager 1202 (or other upstream processes, such as service provided by Adobe Acrobat™) may automatically tag a PDF document by putting content of the document in tags. Tagged PDF documents are documents that include tags indicating a structure of the PDF and/or the content of the PDF. Text tags are used to identify where text regions begin and end in a document.

Text regions in the document are annotated/tagged (manually and/or automatically). The text region manager 1202 (or other upstream process) may mask the document using the tags/annotations in the document. In this manner, a document is created with identified (e.g., masked) text regions. The documents that have been masked are the actual outputs 1408 used for training the machine learning model 1404.

To train the machine learning model 1404 to predict a probability that each pixel belongs to a boundary, training inputs 1402 and corresponding actual outputs 1408 may be manually provided to the machine learning model. For example, one or more users may enter training inputs 1402 (e.g., images with text) and corresponding actual outputs 1408 (e.g., images with labeled text regions) to train the machine learning model 1404 to predict a probability that each pixel belongs to a boundary.

Generally, the machine learning model 1404 uses the training inputs 1402 to predict outputs 1406 by applying the current state of the machine learning model 1404 to the training inputs 1402. A comparator 1418 may compare the predicted outputs 1406 to the actual outputs 1408 to determine an amount of error or difference (represented by error signal 1412).

The error signal 1412 determined by the comparator may be used to adjust the weights in the machine learning model 1404 such that the machine learning model 1404 changes (or learns) over time to generate a relatively accurate prediction of each pixel belonging to a boundary. The machine learning model 1404 may be trained using backpropagation, for instance. The backpropagation algorithm operates by propagating the error signal 1412. The error signal 1412 may be calculated each iteration (e.g., each pair of training inputs 1402 and corresponding actual outputs 1408), batch, and/or epoch and propagated through all of the algorithmic weights of the machine learning model 1404 such that the algorithmic weights adapt based on the amount of error. The error is minimized using a loss function. Non-limiting examples of loss functions include the square error function, the root mean square error function, the cross-entropy error function, and the like.

In some implementations, the convolutional neural network of the text region manager 1202 (e.g., machine learning model 1404) is trained using a clipped binary cross entropy loss function. Using this loss function, loss values are clipped in a mini batch by a clipping constant. In other words, if an error between the predicted output 1406 and the actual output 1408 satisfies a threshold (e.g., the clipping constant), then the error (e.g., the loss) is not propagated through the machine learning model 1404. The clipping constant may be predetermined (e.g., empirically determined). In some implementations, the clipping constant is defined to be 0.2.

The weighting coefficients of the machine learning model 1404 may be tuned to reduce the amount of error, thereby minimizing the differences between (or otherwise converging) the predicted output 1406 and the actual output 1408 such that the predicted pixels belonging to a boundary in the image are similar to the pixels belonging to a boundary in the image. The machine learning model 1404 may be trained until the error determined at the comparator 1418 is within a certain threshold (or a threshold number of batches, epochs, or iterations have been reached). The trained machine learning model 1404 and associated weighting coefficients may subsequently be stored in memory or other data repository (e.g., a database) such that the machine learning model 1404 may be employed on unknown data (e.g., not training inputs 1402). Once trained and validated, the machine learning model 1404 may be employed during testing (or an inference phase). During testing, the machine learning model 1404 may ingest unknown image inputs to predict the probability of pixels belonging to a boundary. In this manner, the region manager 1202 text information related to a location of text in a document (e.g., a text region).

Figure 15:
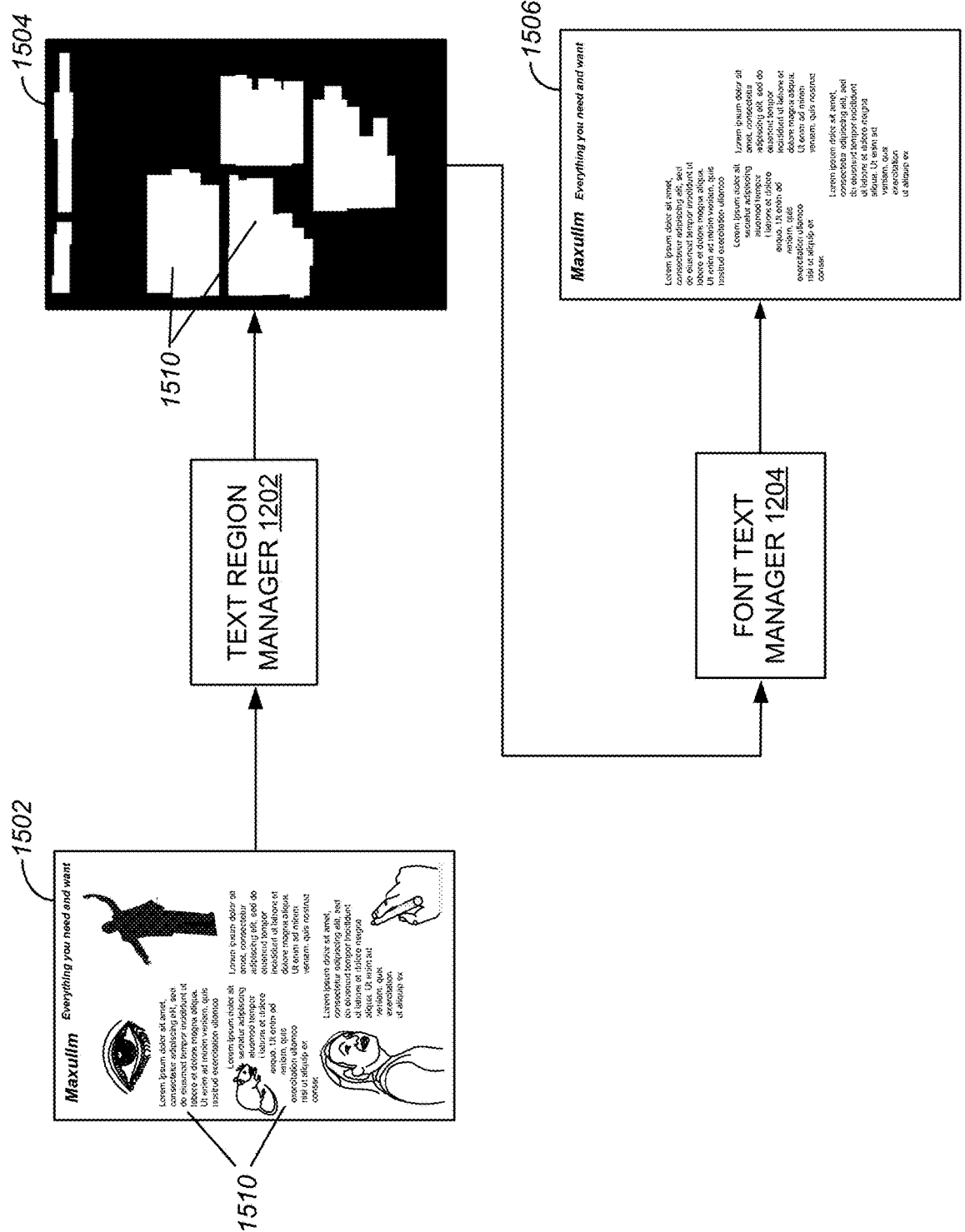
FIG. 15 illustrates an example implementation of a font type manager, in accordance with one or more embodiments.

FIG. 15 illustrates an example implementation of a font type manager 1204, in accordance with one or more embodiments. The font type manager 1204 determines additional text information such as a font type of the text in the text region.

As described herein, the text region manager 1202 receives a source image 1502. In other embodiments, the source image may be a preprocessed image and/or an image output from the background extractor 102. The image 1502 includes text identified in text regions 1510. As described herein, the text region manager 1202 determines a location (or a probability of a location) of text regions 1510 in a masked image 1504 of the source image. The font type manager 1204 receives the masked image 1504 from the text region manager 1202.

The font type manager 1204 applies an adaptive threshold algorithm to each identified region of text. Specifically, a unique threshold is applied to each pixel in the region of text (as opposed to global thresholding techniques that apply the same threshold to each pixel). The font type manager 1204 evaluates the pixel variation among adjacent pixels (or other pixel neighbors) and determines a threshold to apply to a pixel based on the average variation of the adjacent pixels. Adaptive thresholding is a tool to classify pixels as being light or dark. In this manner, the font type manager 1204 identifies the shape of each character in a text region. In some embodiments, the font type manager 1204 applies adaptive thresholding on an integral image computed from the input 120. An integral image is an image of equal dimension to an input (e.g., image 120), where each cell in the integral image corresponds to a sum of pixels in a region of the input. Applying adaptive thresholding on an integral image improves the speed in which adaptive thresholding is performed.

Identifying the shape of each character in a text region allows the font type manager 1204 to perform template based font matching (or any other font matching technique) to identify or otherwise classify the font of the text in the image. In some embodiments, the type manager 1204 employs one or more font libraries (or one or more APIs such as Adobe APIs™) to match a style/shape identified in the font information to a font. In an example implementation, the type manager 1204 compares the style/shape of the text identified in the font information to various fonts in a font library. For example, the pixels of one or more characters of the extracted font information are compared to the pixels of one or more characters of font in the font library. The type manager 1204 determines the font that most closely resembles the font information by identifying a highest similarity (or a lowest error) between the compared pixels.

As illustrated, the output of the font type manager 1204 is an image 1506 including font corresponding to the font in the source image 1502 at font locations 1510. By determining the font corresponding to the font in the source image 1502, the font type manager 1204 has determined font information. Font information (e.g., the font type) may be defined as information related to the specific visual style of characters in the text.

Figure 16:
FIGS. 16-18 illustrate a first non-limiting example of recommending templates using the template recommendation system, in accordance with one or more embodiments.
Figure 17:
Figure 18:
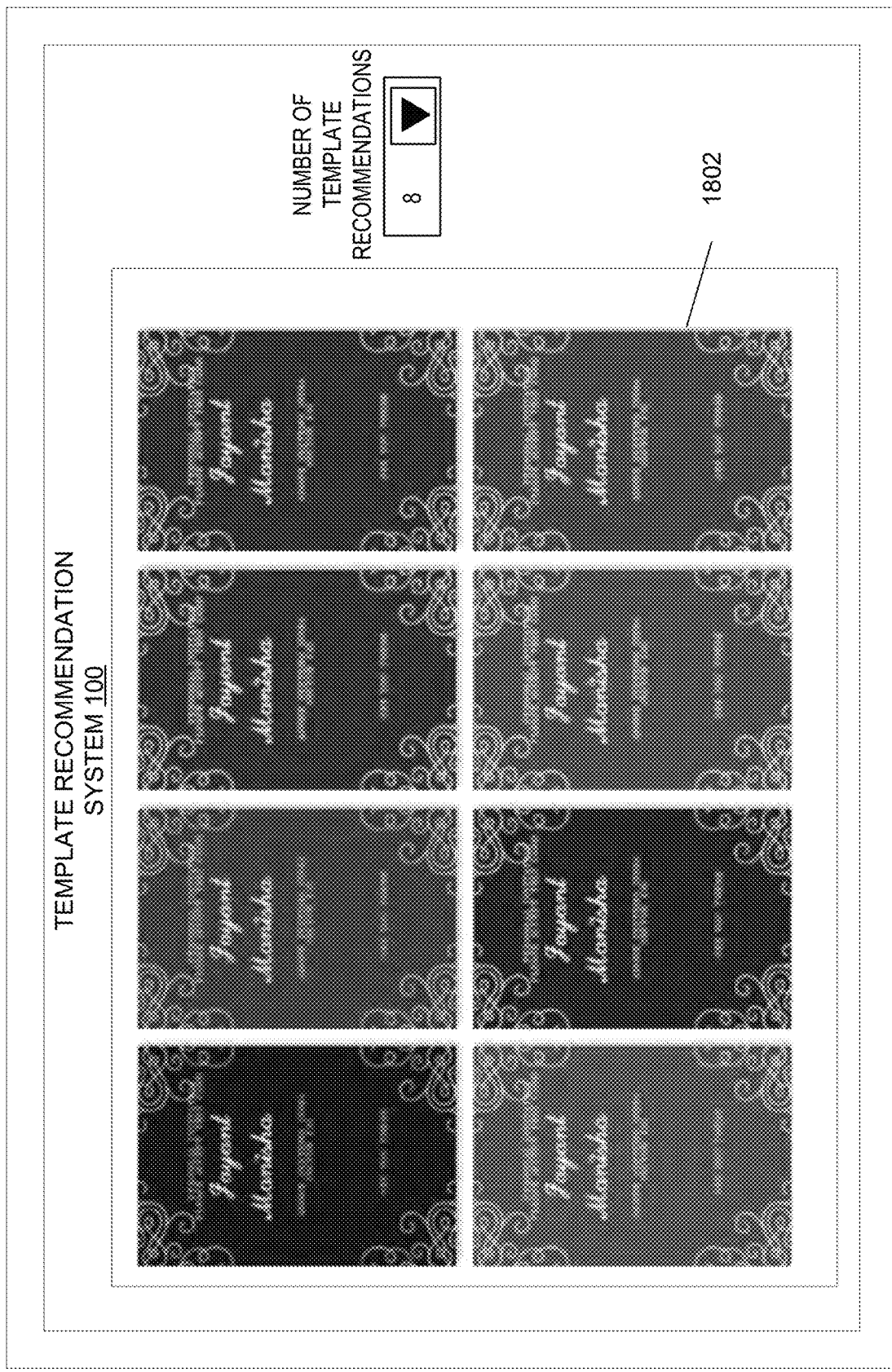

FIGS. 16-18 illustrate a first non-limiting example of recommending templates using the template recommendation system, in accordance with one or more embodiments. As shown in FIG. 16, a user may upload input image 1602. A user may also select a number of template recommendations using drop down menu 1614. In other embodiments, a user may select a number of template recommendations using a slider, radial buttons (or other interactive elements displayed on the user interface), a text box, and the like.

As described herein, the template recommendation system 100 generates an editable template recommendation using font location information and/or font information extracted from the input 120 (determined by the text information extractor 106 as described here). The template recommendation system 100 transmits the customizable template recommendation to the user interface. Subsequently, the template recommendation system 100 receives one or more modifications (e.g., a customization). As shown in FIG. 17, a user manipulates the text of input image 1602 in image 1702. The user may modify the text of the template at the font location using the font type.

In response to receiving a customization of input image 1602, the template recommendation system 100 transmits for display, a number of diverse color harmonized image templates incorporating the received text. FIG. 18 illustrates the template recommendation system 100 displaying a number of diverse color harmonized customized template images based on the customized text in FIG. 17. The number of color harmonized template recommendations displayed is based on the user-selected value received from 1614. As shown in 1802, eight customized color harmonized templates are displayed.

It should be appreciated the template recommendations (e.g., the color harmonized templates, the customizable font type, the customizable font location, etc.) are displayed in any order. For example, the text compiler 108 may aggregate any combination of diverse color harmonized template images, the text location information and the font type information in any order. Moreover, the update of the displayed template recommendation occurs in any order.

For instance, in a second non-limiting example, the template recommendation system 100 generates a customizable template recommendation and displays multiple color harmonized templates based on a source image. Each of the color harmonized templates are customizable using the font location information and/or the font information extracted from the source image. In response to receiving a text modification to one color harmonized templates, template recommendation system 100 applies the text modification to each of the displayed color harmonized templates. In this manner, each of the displayed color harmonized templates are synchronized.

Figure 19:
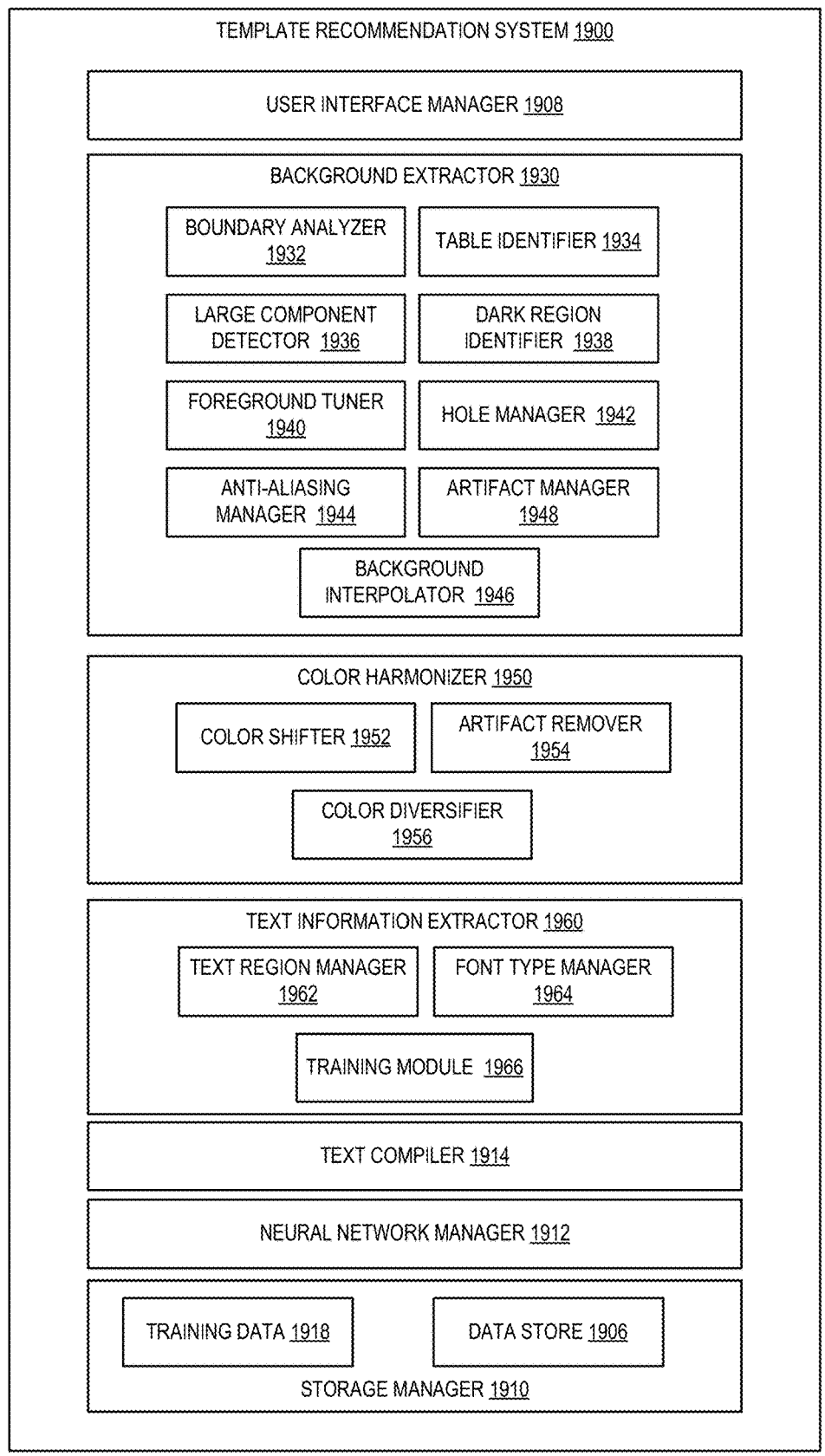
FIG. 19 illustrates a schematic diagram of a template recommendation system in accordance with one or more embodiments.

FIG. 19 illustrates a schematic diagram of template recommendation system (e.g., "template recommendation system" described above) in accordance with one or more embodiments. As shown, the template recommendation system 1900 may include, but is not limited to, a background extractor 1930, a color harmonizer 1950, a text information extractor 1960, a text compiler 1914, a storage manager 1910, a training module 1916, a user interface manager 1908, and a neural network manager 1912. The background extractor 1930 includes a boundary analyzer 1932, a table identifier 1934, a large component detector 1936, a dark region identifier 1938, a foreground tuner 1940, a hole manager 1942, an anti-aliasing manager 1944, and an artifact manager 1948. The color harmonizer 1950 includes a color shifter 1952, an artifact remover 1954, and a color diversifier 1956. The text information extractor 1960 includes a text region manager 1962, a font type manager 1964, and a training module 1966.

The template recommendation system 1900 includes a user interface manager 1908. The user interface manager 1908 allows user to provide inputs to the template recommendation system 1900. Inputs include user preferences (e.g., a number template recommendations to display) and images to be customized (e.g., input 120 in FIG. 1). The user interface manager 1908 may enable the user to download images from a local or remote storage location (e.g., by providing an address (e.g., a URL or other endpoint) associated with an image source). In some embodiments, the user interface manager 1908 can enable a user to link an image capture device such as a camera or other hardware to capture image data and provide it to the template recommendation system 1900.

As described herein, the template recommendation system 1900 receives an input image. The template recommendation system 1900 executes various modules to provide customizable, visually aesthetic color diverse template recommendations derived from a source image. For example, using the managers of the background extractor 102, the foreground of the image is separated from the background of the image to derive a source image background.

In particular, the boundary analyzer 1932 may be executed to separate an obstruction at the boundary of an image, from the background. The table identifier 1934 identifies tables as foreground objects to distinguish any shading of cells of the table as part of the background image. The large component detector 1936 separates large components as part of the foreground, from the background. The dark region identifier 1938 generates a luminance map of the image because dark regions of an image may be part of the foreground of the image. The foreground tuner 1940 tunes identified foreground regions using two or more images output from two or more managers of the background extractor 102. The hole manager 1942 is configured to identify and fill in holes of foreground objects in an image. The anti-aliasing manager 1944 smooths aliasing in an image. The artifact manager 1948 minimizes artifacts in an image by smoothing the image. The background interpolator 1946 interpolates a value of a foreground pixel with a value of a background pixel.

As described herein, using the managers of the color harmonizer 1950, a number of color harmonized background template images based on the background template image received from the background extractor 1930 are created. In particular, the color shifter 1952 produces color harmonized versions of the background template image that shift the colors of the background template image, while still remaining faithful to the original color palette. The artifact remover 1954 removes artifacts resulting from color harmonization. The color diversifier 1956 identifies unique color harmonized templates from the set of computed color harmonized templates.

The text information extractor '1960 executes various modules to identify text information (including text location information and/or font type information). In particular, the text region manager 1962 identifies a location of text in an image, and the font type manager 1964 identifies a type of font in the image. Using the extracted information, a user can customize the text of the image according to the same font location and font type.

The text region manager 1962 is trained using a training module 1966 to predict a probability of each pixel belonging to a boundary in the image. The training module 1966 provides the text region manager 1962 input-output pairs during training. Using supervised learning, the predicted pixels belonging to a boundary in an image converge with the actual pixels belonging to a boundary in an image. The training module 1966 trains the text region 1962 over time using a modified loss term (e.g., a clipped binary cross entropy loss function). The data store 1906 is responsible for querying one or more databases/servers (e.g., local databases, remote databases, etc.), upstream processes (such as those provided by Adobe Acrobat™), and/or APIs (such as Adobe APIs™ for training data 1918 such as fully tagged PDFs.

The text compiler 1914 aggregates the text location information and font information (determined by the modules of the text information extractor 1960) and the color harmonized templates (determined by the modules of the color harmonizer 1950) to compile one or more customizable, visually aesthetic image templates.

The template recommendation system 1900 also includes a neural network manager. The neural network manager 1912 hosts a plurality of neural networks or other machine learning models, such as convolutional neural networks of the text region manager 1962. The neural network manager 1912 includes an execution environment, libraries, and/or any other data needed to execute the machine learning models. In some embodiments, the neural network manager 1912 may be associated with dedicated software and/or hardware resources to execute the machine learning models. In various embodiments, each machine learning model hosted by neural network manager 1912 may be the same type of machine learning model or may be different types of machine learning models, depending on implementation. Although depicted in FIG. 19 as being hosted by a single neural network manager 1912, in various embodiments the neural networks may be hosted in multiple neural network managers and/or as part of different components. For example, the text information extractor 1960 can be hosted by its own neural network manager, or other host environment, in which the respective neural networks execute, or the machine learning models may be spread across multiple neural network managers depending on, e.g., the resource requirements of the convolutional neural network, etc.

As illustrated in FIG. 19, the text recommendation system also includes the storage manager 1910. The storage manager 1910 maintains data for the text recommendation system 1900. The storage manager 1910 can maintain data of any type, size, or kind as necessary to perform the functions of the scene enrichment system 1900. The storage manager 1910, as shown in FIG. 19, includes the training data 1918. As described herein, training data 1918 can include input-output pairs such as manually labeled pdfs and/or fully tagged pdfs. The storage manager 1910 also includes data store 1906. As described herein, the data store 1906 may store addresses (e.g., memory addresses, URL addresses, MAC addresses, IP addresses, port addresses, etc.) in which to query data from. Additionally or alternatively, the data store 1906 stores API information such that the template recommendation system 1900 can execute various APIs.

Each of the components (including the background extractor 1930, color harmonizer 1950, text information extractor 1960, text compiler 1914, storage manager 1910, training module 1916, user interface manager 1908, and neural network manager 1912)of the template recommendation system 1900 and their corresponding elements (including the boundary analyzer 1932, table identifier 1934, large component detector 1936, dark region identifier 1938, foreground tuner 1940, hole manager 1942, anti-aliasing manager 1944, artifact manager 1948, color shifter 1952, artifact remover 1954, color diversifier 1956, a text region manager 1962, font type manager 1964, training module 1966, training data 1918 and data store 1906)) may be in communication with one another using any suitable communication technologies. It will be recognized that although components and their corresponding elements are shown to be separate in FIG. 19, any of components and their corresponding elements may be combined into fewer components, such as into a single facility or module, divided into more components, or configured into different components as may serve a particular embodiment.

The components can comprise software, hardware, or both. For example, the components can comprise one or more instructions stored on a computer-readable storage medium and executable by processors of one or more computing devices. When executed by the one or more processors, the computer-executable instructions of the template recommendation system 1900 can cause a client device and/or a server device to perform the methods described herein. Alternatively, the components can comprise hardware, such as a special purpose processing device to perform a certain function or group of functions. Additionally, the components can comprise a combination of computer-executable instructions and hardware.

Furthermore, the components of the template recommendation system 1900 may, for example, be implemented as one or more stand-alone applications, as one or more modules of an application, as one or more plug-ins, as one or more library functions or functions that may be called by other applications, and/or as a cloud-computing model. Thus, the components of the template recommendation system 1900 may be implemented as a stand-alone application, such as a desktop or mobile application. Furthermore, the components of the template recommendation system 1900 may be implemented as one or more web-based applications hosted on a remote server. Alternatively, or additionally, the components of the template recommendation system 1900 may be implemented in a suite of mobile device applications or "apps."

Figure 20:
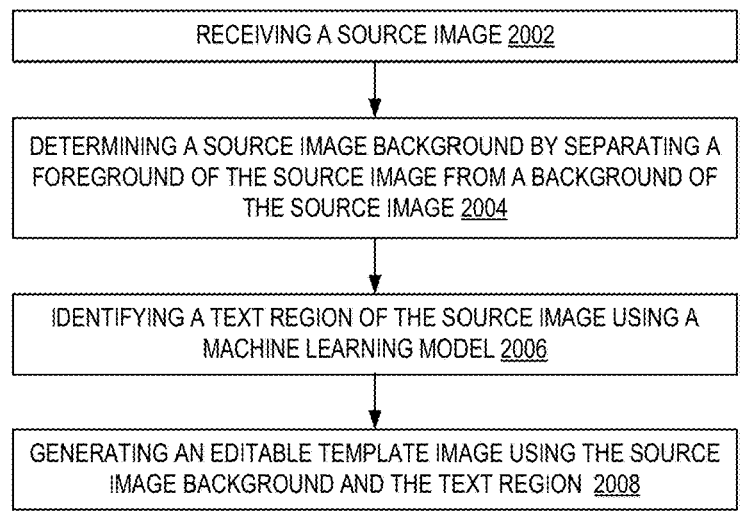
FIG. 20 illustrates a flowchart of a series of acts in a method of providing customizable, visually aesthetic color diverse template recommendations derived from a source image, in accordance with one or more embodiments.

FIGS. 1-PP, the corresponding text, and the examples, provide customizable, visually aesthetic color varied image recommendations derived from a source image. In addition to the foregoing, embodiments can also be described in terms of flowcharts comprising acts and steps in a method for accomplishing a particular result. For example, FIG. 20 illustrates a flowchart of an exemplary method in accordance with one or more embodiments. The method described in relation to FIG. 20 may be performed with fewer or more steps/acts or the steps/acts may be performed in differing orders. Additionally, the steps/acts described herein may be repeated or performed in parallel with one another or in parallel with different instances of the same or similar steps/acts.

FIG. 20 illustrates a flowchart 2000 of a series of acts in a method of providing customizable, visually aesthetic color diverse template recommendations derived from a source image, in accordance with one or more embodiments. In one or more embodiments, the method 2000 is performed in a digital medium environment that includes the template recommendation system 100. The method 2000 is intended to be illustrative of one or more methods in accordance with the present disclosure and is not intended to limit potential embodiments. Alternative embodiments can include additional, fewer, or different steps than those articulated in FIG. 20.

As illustrated in FIG. 20, the method 2000 includes an act 2002 of receiving a source image. The image may be a computer generated image, a frame of a video, a picture captured by a camera (or other sensor), a scanned image, and the like. In some implementations, the source image is a modified template (e.g., a user-modified template recommendation).

The method 2000 includes an act 2004 of determining a source image background by separating a foreground of the source image from a background of the source image. Various objects in the image can be considered the foreground. For example, an image may contain an obstructing finger (e.g., the user captured a digital image including the user's finger). The obstructing finger is part of the foreground of the image. The background extractor 102 executes one or more managers, such as boundary analyzer 202 to separate the finger (as part of the foreground) from the background. In operation, separating the foreground of the source image from the background of the source image comprises removing an object in the source image that is within a threshold distance from a boundary of the source image.

The image may also contain large components (e.g., text, logos, etc.). The background extractor 102 executes one or more managers, such as the large component detector 206 to separate the large components (as part of the foreground) from the background. The image may also contain a table. The background extractor 102 executes one or more managers, such as the table identifier 204 to identify tables as foreground to avoid the background extractor 102 from identifying any shading of cells of the table as part of the background image. In operation, separating the foreground of the source image from the background of the source image comprises removing an object in the source image satisfying a threshold size.

The background extractor 102 also executes one or more managers such as the dark region identifier 208 to identify dark regimes in the image because the dark regimes may be part of objects in the foreground. In particular, the background executor 102 may execute one or more managers such as the foreground tuner 210 to fill in foreground objects using a luminance map of an image and the image with identified foreground objects. In operation, separating the foreground of the source image from the background of the source image comprises generating a luminance map of the source image and removing a pixel of the luminance map, wherein the removed pixel of the luminance map corresponds to a pixel of an object in the foreground of the source image.

The background extractor 102 executes one or more managers such as the background interpolator 216 to extract the source image background (or the image with the foreground removed, also referred to herein as the background template image) by interpolating an image background using the identified foreground (e.g., the pixels that have been identified and set to a value). In this manner, the pixels of the foreground are replaced with pixels of the background. In operation, a pixel of the foreground of the source image to a first value and sets a pixel of the background of the source image to a second value. Subsequently, a closest pixel is determined to the pixel corresponding to the pixel of the foreground of the source image set to the first value by iteratively evaluating a value of additional pixels located radially around the pixel corresponding to the pixel of the foreground of the source image set to the first value, wherein the closest pixel corresponds to the pixel of the background of the source image set to the second value. Next, pixels are identified in the source image corresponding to the closest pixel and the source image background is generated by mapping the pixel corresponding to the pixel of the foreground of the source image set to the first value to a third value of the pixel in the source image corresponding to the closest pixel.

In some embodiments, one or more managers of a color harmonizer generate a plurality of editable template images corresponding to a plurality of color variations of the editable template (e.g., the background template image). The color harmonizer 104 receives the background template image and determines a number of color harmonized background template images. The number of color harmonized template images may be a user-selected value and/or a predetermined value (e.g., a value defined by an administrator). Harmonic colors are sets of colors that may be aesthetically pleasing based on color relationships in a color space. The color harmonizer 104 executes one or more managers such as the color shifter 1102 to produce color harmonized versions of the background template image that shift the colors of the background template image, while still remaining faithful to the original color palette.

In some implementations, artifacts arise from generating the plurality of editable template images. The color harmonizer 104 executes one or more managers such as the artifact remover 1104 to remove editable template images with artifacts by comparing a visual similarity of each of a plurality of editable template images (e.g., color harmonized templates) to the editable template image (e.g., the background template image). A visual similarity of each editable template is determined to evaluate whether an editable template image satisfies a threshold. Editable template images of the plurality of editable template images are pruned if the editable template images do not satisfy the threshold The color harmonizer 104 also executes one or more managers such as the color diversifier 1102 to identify unique color harmonized templates from the computed color harmonized templates. For example, when the color harmonizer 104 (e.g., the color shifter 1102) generates color harmonized templates, some of the color harmonized templates may appear visually similar. The color diversifier of the color harmonizer 104 may remove visually similar color harmonized templates such that the color harmonizer 104 generates a set of unique color harmonized templates. In operation, the plurality of editable template images are clustered into clusters of similar color variations. A histogram of each editable template image in each cluster is subsequently obtained. Within each cluster, each histogram is compared, and a histogram with a maximum difference from each other histogram in the cluster is identified.

The method 2000 includes an act 2006 of identifying a text region of the source image using a machine learning model. For example, a text information extractor 106 executes one or more managers such as a text region manager 1202 to feed the image 120 into a neural network such as a convolutional neural network. The convolutional neural network is trained to predict the probability of each pixel in the image belonging to a boundary using supervised learning. Specifically, the machine learning model is trained to predict the text region using a clipped binary cross entropy loss function.

After the text information extractor 106 (e.g., the text region manager 1202) determines a text region, the text information extractor 106 executes one or more managers such as the font type manager 1204 to determine additional text information such as a font type of the text in the text region. Using the additional text information, the font type manager 1204 may perform template based font matching to identify or otherwise classify the font of the text in the document. For example, the pixels of one or more characters of the additional text information (e.g., the font type) are compared to the pixels of one or more characters of font in the font library. The font type manager 1204 determines the font that most closely resembles the font information by identifying a highest similarity (or a lowest error) between the compared pixels.

The method 2000 includes an act 2008 of generating an editable text image using the source image background and the text region. For example, template compiler 108 complies template recommendations (e.g., an editable template image) to be displayed to a user using a user interface. The template compiler receives a set of color harmonized templates from the color harmonizer 104. As described herein, each color harmonized template may be unique (e.g., visually distinct) from the other color harmonized templates. The template compiler 108 also receives text information from the text information extractor 106. For example, the template compiler 108 receives font location information (e.g., a location of text in the input 120) and/or a font used in the input 120. The text compiler 108 combines some or all of the received information to generate one or more customizable template recommendations to be displayed to a user.

Figure 21:
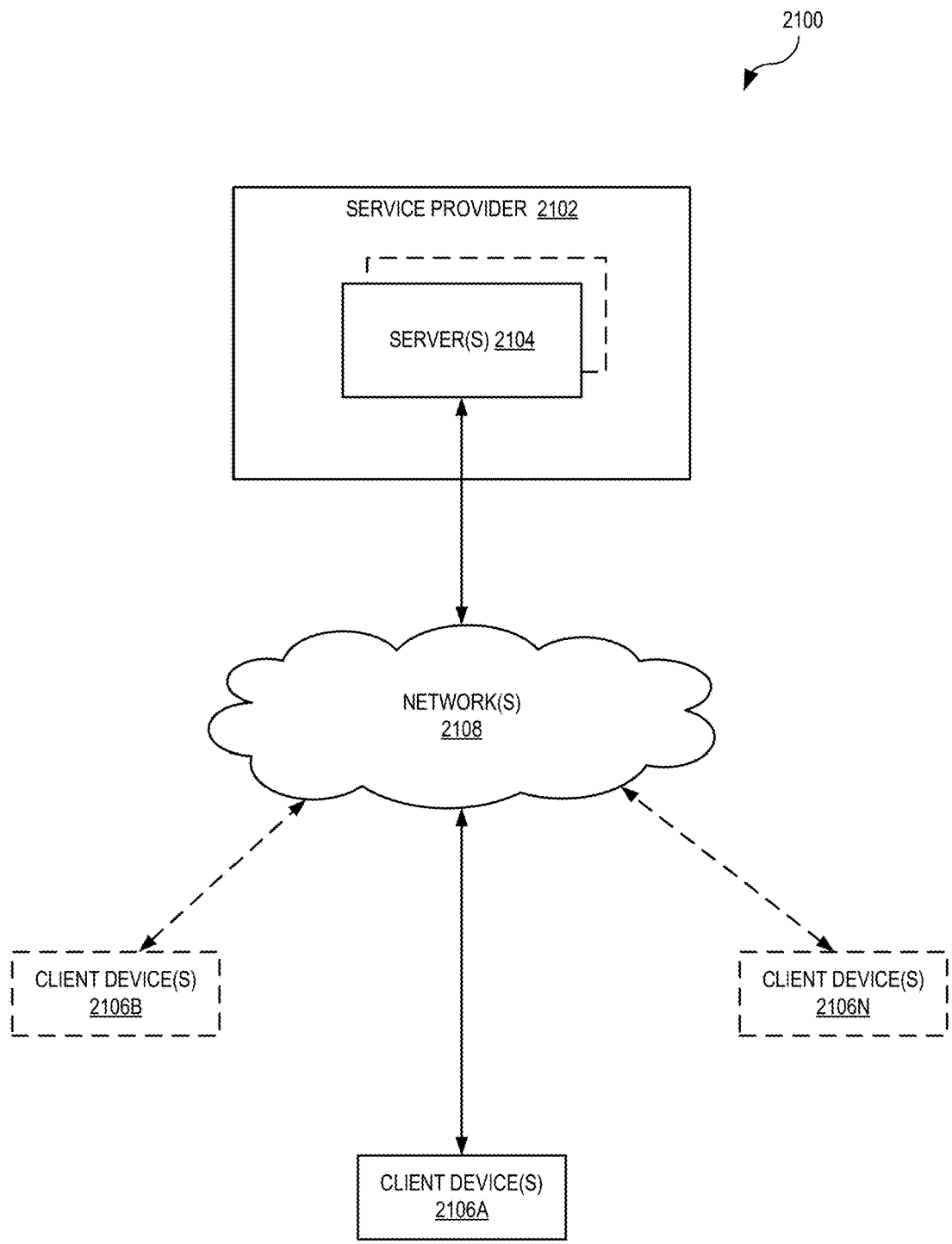
FIG. 21 illustrates a schematic diagram of an exemplary environment in which the template recommendation system can operate in accordance with one or more embodiments.

FIG. 21 illustrates a schematic diagram of an exemplary environment 2100 in which the template recommendation system 1900 can operate in accordance with one or more embodiments. In one or more embodiments, the environment 2100 includes a service provider 2102 which may include one or more servers 2104 connected to a plurality of client devices 2106A-2106N via one or more networks 2108. The client devices 2106A-2106N, the one or more networks 2108, the service provider 2102, and the one or more servers 2104 may communicate with each other or other components using any communication platforms and technologies suitable for transporting data and/or communication signals, including any known communication technologies, devices, media, and protocols supportive of remote data communications, examples of which will be described in more detail below with respect to FIG. 22.

Although FIG. 21 illustrates a particular arrangement of the client devices 2106A-2106N, the one or more networks 2108, the service provider 2102, and the one or more servers 2104, various additional arrangements are possible. For example, the client devices 2106A-2106N may directly communicate with the one or more servers 2104, bypassing the network 2108. Or alternatively, the client devices 2106A-2106N may directly communicate with each other. The service provider 2102 may be a public cloud service provider which owns and operates their own infrastructure in one or more data centers and provides this infrastructure to customers and end users on demand to host applications on the one or more servers 2104. The servers may include one or more hardware servers (e.g., hosts), each with its own computing resources (e.g., processors, memory, disk space, networking bandwidth, etc.) which may be securely divided between multiple customers, each of which may host their own applications on the one or more servers 2104. In some embodiments, the service provider may be a private cloud provider which maintains cloud infrastructure for a single organization. The one or more servers 2104 may similarly include one or more hardware servers, each with its own computing resources, which are divided among applications hosted by the one or more servers for use by members of the organization or their customers.

Similarly, although the environment 2100 of FIG. 21 is depicted as having various components, the environment 2100 may have additional or alternative components. For example, the environment 2100 can be implemented on a single computing device with the template recommendation system 1900. In particular, the template recommendation system 1900 may be implemented in whole or in part on the client device 2102A.

As illustrated in FIG. 21, the environment 2100 may include client devices 2106A-2106N. The client devices 2106A-2106N may comprise any computing device. For example, client devices 2106A-2106N may comprise one or more personal computers, laptop computers, mobile devices, mobile phones, tablets, special purpose computers, TVs, or other computing devices, including computing devices described below with regard to FIG. 22. Although three client devices are shown in FIG. 21, it will be appreciated that client devices 2106A-2106N may comprise any number of client devices (greater or smaller than shown).

Moreover, as illustrated in FIG. 21, the client devices 2106A-2106N and the one or more servers 2104 may communicate via one or more networks 2108. The one or more networks 2108 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 2108 may be any suitable network over which the client devices 2106A-2106N may access service provider 2102 and server 2104, or vice versa. The one or more networks 2108 will be discussed in more detail below with regard to FIG. 22.

In addition, the environment 2100 may also include one or more servers 2104. The one or more servers 2104 may generate, store, receive, and transmit any type of data, including training data 1918 and/or other information. For example, a server 2104 may receive data from a client device, such as the client device 2106A, and send the data to another client device, such as the client device 2102B and/or 2102N. The server 2104 can also transmit electronic messages between one or more users of the environment 2100. In one example embodiment, the server 2104 is a data server. The server 2104 can also comprise a communication server or a web-hosting server. Additional details regarding the server 2104 will be discussed below with respect to FIG. 22.

As mentioned, in one or more embodiments, the one or more servers 2104 can include or implement at least a portion of the template recommendation system 1900. In particular, the template recommendation system 1900 can comprise an application running on the one or more servers 2104 or a portion of the template recommendation system 1900 can be downloaded from the one or more servers 2104. For example, the template recommendation system 1900 can include a web hosting application that allows the client devices 2106A-2106N to interact with content hosted at the one or more servers 2104. To illustrate, in one or more embodiments of the environment 2100, one or more client devices 2106A-2106N can access a webpage supported by the one or more servers 2104. In particular, the client device 2106A can run a web application (e.g., a web browser) to allow a user to access, view, and/or interact with a webpage or website hosted at the one or more servers 2104.

Upon the client device 2106A accessing a webpage or other web application hosted at the one or more servers 2104, in one or more embodiments, the one or more servers 2104 can generate an interface (as shown in FIG. SS) configured to receive a source image (e.g., a scanned image, a photograph captured from a camera or other sensor, a computer-generated image, etc.). The client device 2106A can receive a request (i.e., via user input) to generate K number of template recommendations. Upon receiving the request, the one or more servers 2104 can automatically provide customizable, visually aesthetic color varied template image recommendations. The one or more servers 2104 can provide the one or more recommendations to the client device 2106A for display to the user.

As just described, the template recommendation system 1900 may be implemented in whole, or in part, by the individual elements 2102-2108 of the environment 2100. It will be appreciated that although certain components of the template recommendation system 1900 are described in the previous examples with regard to particular elements of the environment 2100, various alternative implementations are possible. For instance, in one or more embodiments, the template recommendation system 1900 is implemented on any of the client devices 2106A-N. Similarly, in one or more embodiments, the template recommendation system 1900 may be implemented on the one or more servers 2104. Moreover, different components and functions of the template recommendation system 1900 may be implemented separately among client devices 2106A-2106N, the one or more servers 2104, and the network 2108.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 22:
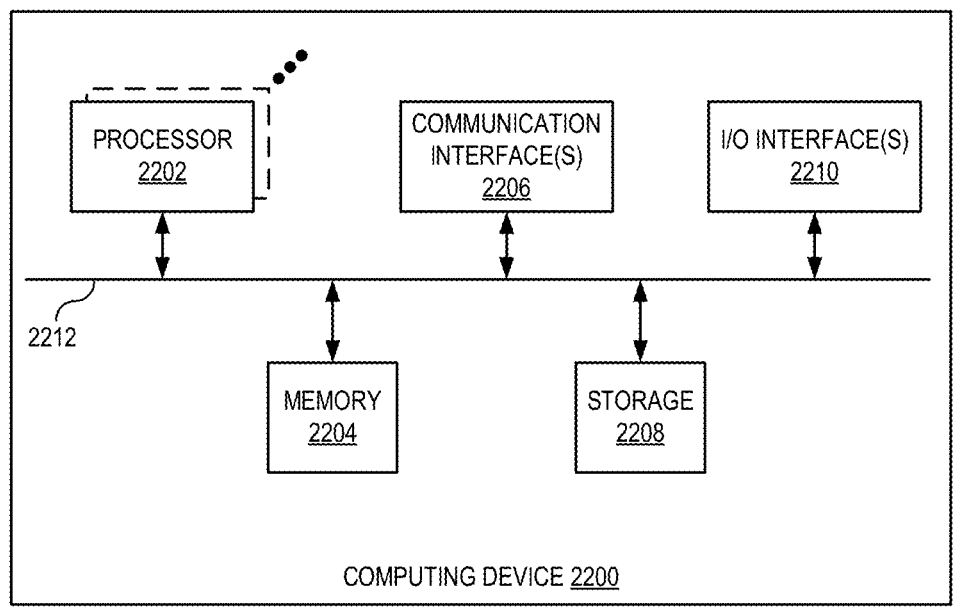
FIG. 22 illustrates a block diagram of an exemplary computing device in accordance with one or more embodiments.

FIG. 22 illustrates, in block diagram form, an exemplary computing device 2200 that may be configured to perform one or more of the processes described above. One will appreciate that one or more computing devices such as the computing device 2200 may implement template recommendation system. As shown by FIG. 22, the computing device can comprise a processor 2202, memory 2204, one or more communication interfaces 2206, a storage device 2208, and one or more I/O devices/interfaces 2210. In certain embodiments, the computing device 2200 can include fewer or more components than those shown in FIG. 22. Components of computing device 2200 shown in FIG. 22 will now be described in additional detail.

In particular embodiments, processor(s) 2202 includes hardware for executing instructions, such as those making up a computer program. As an example, and not by way of limitation, to execute instructions, processor(s) 2202 may retrieve (or fetch) the instructions from an internal register, an internal cache, memory 2204, or a storage device 2208 and decode and execute them. In various embodiments, the processor(s) 2202 may include one or more central processing units (CPUs), graphics processing units (GPUs), field programmable gate arrays (FPGAs), systems on chip (SoC), or other processor(s) or combinations of processors.

The computing device 2200 includes memory 2204, which is coupled to the processor(s) 2202. The memory 2204 may be used for storing data, metadata, and programs for execution by the processor(s). The memory 2204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 2204 may be internal or distributed memory.

The computing device 2200 can further include one or more communication interfaces 2206. A communication interface 2206 can include hardware, software, or both. The communication interface 2206 can provide one or more interfaces for communication (such as, for example, packet-based communication) between the computing device and one or more other computing devices 2200 or one or more networks. As an example and not by way of limitation, communication interface 2206 may include a network interface controller (NIC) or network adapter for communicating with an Ethernet or other wire-based network or a wireless NIC (WNIC) or wireless adapter for communicating with a wireless network, such as a WI-FI. The computing device 2200 can further include a bus 2212. The bus 2212 can comprise hardware, software, or both that couples components of computing device 2200 to each other.

The computing device 2200 includes a storage device 2208 includes storage for storing data or instructions. As an example, and not by way of limitation, storage device 2208 can comprise a non-transitory storage medium described above. The storage device 2208 may include a hard disk drive (HDD), flash memory, a Universal Serial Bus (USB) drive or a combination these or other storage devices. The computing device 2200 also includes one or more input or output ("I/O") devices/interfaces 2210, which are provided to allow a user to provide input to (such as user strokes), receive output from, and otherwise transfer data to and from the computing device 2200. These I/O devices/interfaces 2210 may include a mouse, keypad or a keyboard, a touch screen, camera, optical scanner, network interface, modem, other known I/O devices or a combination of such I/O devices/interfaces 2210. The touch screen may be activated with a stylus or a finger.

The I/O devices/interfaces 2210 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 2210 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
receiving a source image;
determining a source image background by separating a foreground of the source image from a background of the source image;
identifying a text region of the source image using a machine learning model; and
combining the source image background and the text region to generate an editable template image.

2. The method of claim 1, wherein separating the foreground of the source image from the background of the source image comprises removing an object in the source image that is within a threshold distance from a boundary of the source image.

3. The method of claim 1, wherein separating the foreground of the source image from the background of the source image comprises removing an object in the source image satisfying a threshold size.

4. The method of claim 1, wherein separating the foreground of the source image from the background of the source image comprises generating a luminance map of the source image and removing a pixel of the luminance map, wherein the removed pixel of the luminance map corresponds to a pixel of an object in the foreground of the source image.

5. The method of claim 1, wherein determining the source image background further comprises:
setting a pixel of the foreground of the source image to a first value;
setting a pixel of the background of the source image to a second value;
determining a closest pixel to the pixel corresponding to the pixel of the foreground of the source image set to the first value by iteratively evaluating a value of additional pixels located radially around the pixel corresponding to the pixel of the foreground of the source image set to the first value, wherein the closest pixel corresponds to the pixel of the background of the source image set to the second value;
identifying a pixel in the source image corresponding to the closest pixel; and
generating the source image background by mapping the pixel corresponding to the pixel of the foreground of the source image set to the first value to a third value of the pixel in the source image corresponding to the closest pixel.

6. The method of claim 1, further comprising generating a plurality of editable template images corresponding to a plurality of color variations of the editable template image.

7. The method of claim 6, further comprising:
comparing a visual similarity of each of the plurality of editable template images to the editable template image;
determining that a visual similarity of an editable template image satisfies a threshold; and
pruning an editable template image of the plurality of editable template images.

8. The method of claim 6, further comprising:
clustering the plurality of editable template images into clusters of similar color variations;
obtaining a histogram of each editable template image in each cluster; and
in each cluster,
compare each histogram of each editable template image, and
identify a histogram with a maximum difference from each other histogram in the cluster.

9. The method of claim 1, wherein the machine learning model is trained to predict the text region using a clipped binary cross entropy loss function.

10. The method of claim 1, further comprising obtaining a font type of the source image.

11. The method of claim 10, wherein obtaining the font type of the source image comprises using template-based matching.

12. A non-transitory computer-readable medium storing executable instructions, which when executed by a processing device, cause the processing device to perform operations comprising:
receiving a source image;
identifying one or more pixels associated with a foreground object;
replacing the one or more pixels associated with the foreground object with corresponding one or more pixels associated with a background to obtain a source image background;
identifying a location of text of the source image;
combining the source image background and the location of text to generate a template image; and
displaying the template image, wherein text at the location of text of the source image is customizable in the template image.

13. The non-transitory computer-readable medium of claim 12, wherein identifying one or more pixels associated with the foreground object and replacing the one or more pixels associated with the foreground object with corresponding one or more pixels associated with the background further comprises:
setting a pixel of the foreground of the source image to a first value;
setting a pixel of the background of the source image to a second value;
determining a closest pixel to the pixel corresponding to the pixel of the foreground of the source image set to the first value by iteratively evaluating a value of additional pixels located radially around the pixel corresponding to the pixel of the foreground of the source image set to the first value, wherein the closest pixel corresponds to the pixel of the background of the source image set to the second value;

identifying a pixel in the source image corresponding to the closest pixel; and generating a source image background by mapping the pixel corresponding to the pixel of the foreground of the source image set to the first value to a third value of the pixel in the source image corresponding to the closest pixel.

14. The non-transitory computer-readable medium of claim 12 storing executable instructions, which, when executed by the processing device, cause the processing device to perform further operations comprising generating a plurality of template images corresponding to a plurality of color variations of the template image.

15. The non-transitory computer-readable medium of claim 14, storing executable instructions, which, when executed by the processing device, cause the processing device to perform further operations comprising:

comparing a visual similarity of each of the plurality of template images to the template image;

determining that a visual similarity of a template image satisfies a threshold; and pruning a template image of the plurality of template images.

16. The non-transitory computer-readable medium of claim 14, storing executable instructions, which, when executed by the processing device, cause the processing device to perform further operations comprising:

clustering the plurality of template images into clusters of similar color variations;

obtaining a histogram of each template image in each cluster; and in each cluster, compare each histogram of each template image, and identify a histogram with a maximum difference from each other histogram in the cluster.

17. The non-transitory computer-readable medium of claim 12, wherein identifying the location of text of the source image comprises executing a machine learning model trained to predict the location of text using a clipped binary cross entropy loss function.

18. The non-transitory computer-readable medium of claim 12, storing executable instructions, which, when executed by the processing device, cause the processing device to perform further operations comprising obtaining a font type of the source image.

19. The non-transitory computer-readable medium of claim 18, wherein obtaining the font type of the source image comprises using template-based matching.

20. A system comprising:

a memory component; and a processing device coupled to the memory component, the processing device to perform operations comprising:

receiving a source image;

determining a source image background by separating a foreground of the source image from a background of the source image;

identifying a text region of the source image using a machine learning model; and combining the source image background and the text region to generate an editable template image.

* * * * *